US012277590B1

United States Patent
Morello et al.

(10) Patent No.: US 12,277,590 B1
(45) Date of Patent: Apr. 15, 2025

(54) SYSTEMS AND METHOD FOR GENERATING RECOMMENDATIONS BASED ON LOCATION-BASED, ITEM SIMILARITIES

(71) Applicant: Amazon Technologies, Inc., Seattle, WA (US)

(72) Inventors: Albert J. Morello, Middleton, MA (US); Vinod Krishnan Kulathumani, Westborough, MA (US); Lawrence Lindstrom Page, Worcester, MA (US); Tyler Allan Hendrickson, Tewksbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 1 day.

(21) Appl. No.: 17/543,396

(22) Filed: Dec. 6, 2021

(51) Int. Cl.
*G06Q 30/0601* (2023.01)
*B62B 3/14* (2006.01)

(52) U.S. Cl.
CPC ....... *G06Q 30/0631* (2013.01); *B62B 3/1424* (2013.01); *G06Q 30/0639* (2013.01)

(58) Field of Classification Search
None
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,127,438 B1 | 11/2018 | Fisher et al. | |
| 10,133,933 B1 | 11/2018 | Fisher et al. | |
| 10,949,910 B2 * | 3/2021 | Carpenter | G06Q 30/0266 |
| 11,282,059 B1 * | 3/2022 | Raak | G06Q 20/208 |
| 2006/0289637 A1 * | 12/2006 | Brice | G06Q 10/087 235/383 |
| 2009/0083121 A1 * | 3/2009 | Angell | G06Q 30/02 705/7.33 |
| 2013/0284806 A1 | 10/2013 | Margalit | |
| 2017/0357939 A1 * | 12/2017 | Jones | H02K 7/1846 |
| 2019/0156513 A1 * | 5/2019 | McNeally | G01C 21/16 |
| 2020/0198680 A1 * | 6/2020 | Hagen | H04B 5/0062 |

OTHER PUBLICATIONS

Seiler, S., & Yao, S. (2017). The impact of advertising along the conversion funnel. Quantitative Marketing and Economics, 15(3), 241-278. doi:http:/dx.doi.org/10.1007/s11129-017-9184-y (Year: 2017).*

* cited by examiner

*Primary Examiner* — Jeffrey A. Smith
*Assistant Examiner* — Ashley D Preston
(74) *Attorney, Agent, or Firm* — Kilpatrick Townsend & Stockton LLP

(57) ABSTRACT

This disclosure is directed to, in part, mobile carts and/or associated computing devices that are configured to determine their respective location, determine an item in a facility that is associated with an item location that is nearest the location of the cart, determine one or more items that have been designated as similar to the nearest item, and output recommendation data corresponding to the similar items. In some instances, items may be ranked according to similarity based on a comparison of text data associated with the items, based on a comparison of location data associated with the items in other facilities, or the like.

20 Claims, 18 Drawing Sheets

SYSTEMS AND METHOD FOR GENERATING RECOMMENDATIONS BASED ON LOCATION-BASED, ITEM SIMILARITIES

BACKGROUND

Materials handling facilities, such as warehouses or retail stores, often provide users with carts to facilitate the processes by which the users locate, identify, retrieve, and transport items at the facilities. For example, when a user identifies an item that he or she desires on a shelf or other location within a materials handling facility, the user may remove the item from the shelf or other location, and place the item into a receptacle of a cart before the user continues to travel through the facility in search of additional items. The cart may have a durable frame or structure that is configured to travel on wheels such that users are able to fill the carts with numerous, and potentially heavy, items they desire, and use the mobile cart to transport the items around the materials handling facilitate with ease, rather than having to carry the items.

Traditionally, when the user has finished identifying and retrieving the items he or she desires, the user may transport the items in the cart to a check-out destination within the materials handling facility, such as a distribution station, a cashier, or a dedicated self-checkout stand, and transition the items to a human operator or an automated agent. Typically, the user or the human operator manually removes the items from the cart, scans or otherwise registers the items with the user, and places the items into one or more bags or other item carriers. The user may then use the bags or other item carriers to transport the items to another destination (e.g., to an automobile, workstation, or home) by manually carrying the item carriers to the other destination, or by transporting the item carriers to the destination within the cart.

Thus, retrieving items from shelves or other locations within a materials handling facility, and placing the items into bags or other carriers for transportation to their desired destination (e.g., automobile or home), may be a two-step process. First, the items must be retrieved from the shelves or other storage locations and placed into the cart, and second, the items must be removed from the cart, scanned, and placed into a bag or other item carrier. These intervening actions that are required to transition items from a shelf or other storage location into the bags or other item carrier necessarily slows the process by which items are retrieved from a materials handling facility, and tend to mitigate the advantages that carts provide.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
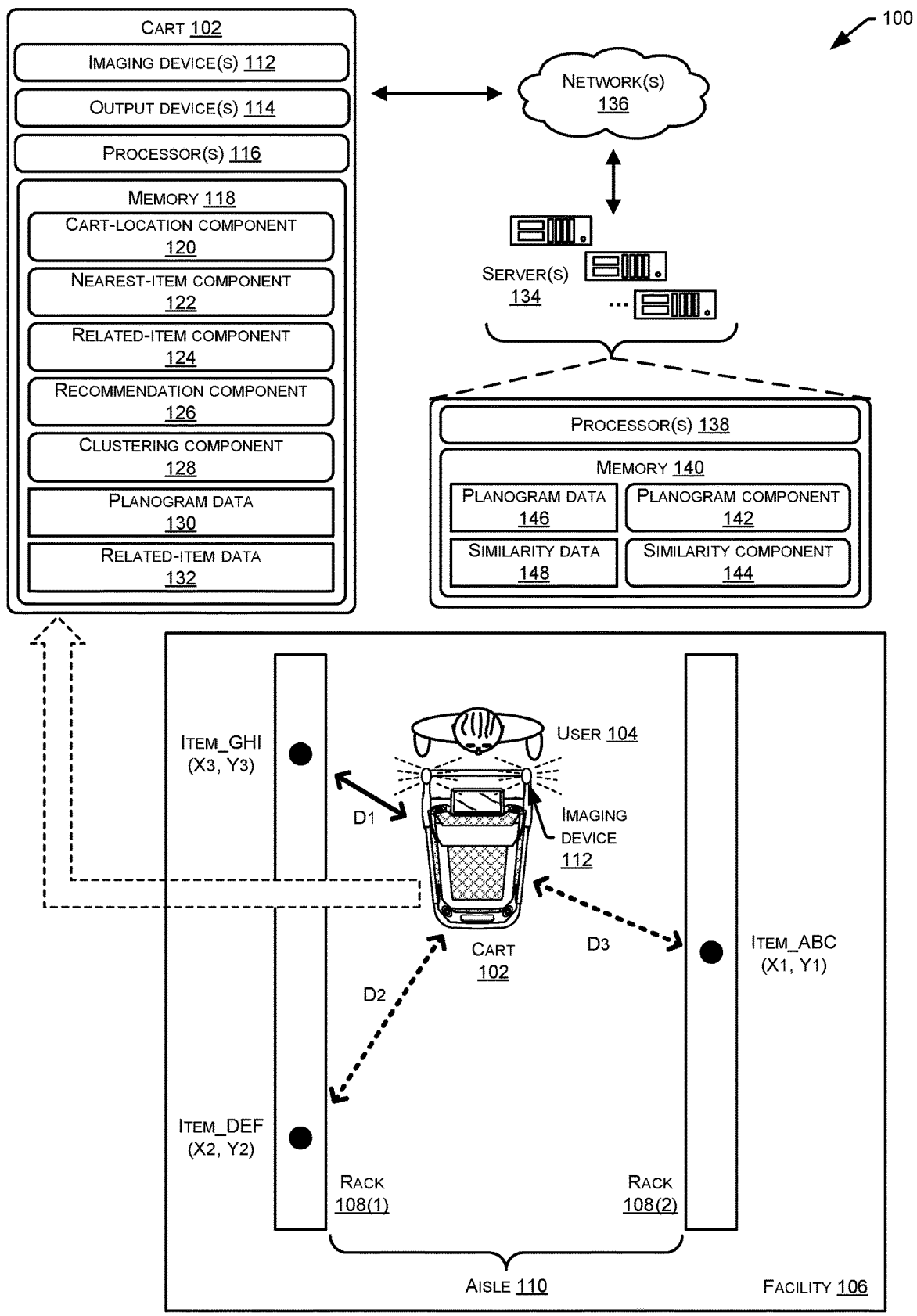
FIG. 1 illustrates an example architecture that includes a user operating a mobile cart in a facility. As illustrated, the mobile cart includes one or more cameras configured to generate image data, which the cart may use to determine a current location of the mobile cart within the facility. In addition, the mobile cart may determine, using the current location, an item in the facility having a known item location and, thereafter, may determine items that are related to this item for outputting recommendation data to the user operating the cart.

This disclosure is directed to, in part, mobile carts and/or associated computing devices that are configured to determine their respective location, determine an item in a facility that is associated with an item location that is nearest the location of the cart, determine one or more items that have been designated as similar to the nearest item, and output recommendation data corresponding to the similar items. In some instances described below, items may be ranked according to similarity based on a comparison of text data associated with the items, based on a comparison of location data associated with the items in other facilities, or the like.

In some instances, a mobile cart as described herein may include a display or other output device that is configured to output information regarding items that may be pertinent to a current location of the mobile cart in a facility. For instance, as a user operates a cart throughout the facility, the cart may output information regarding items that are near the current location of the cart and that may be of interest to the user. However, in order to the output this information, the cart may first determine its current location and determine which items are associated with this current location. When a facility is associated with a complete planogram indicating the location of each item in the facility, the information regarding which items are associated with a current location may be readily available via the planogram. However, when a facility has yet to develop a full planogram, identifying which items are associated with which locations in the facility may be more difficult.

Thus, in some instances described herein, one or more items, but less than all of the items available in the facility, may initially be associated with a respective item location, which may act as initial planogram data for the facility. Thereafter, the items that are associated with respective locations may be used to determine related items, which in turn may be used to output the information regarding the related items on the mobile cart.

For instance, prior to a facility being associated with a complete planogram, a subset of the items may be associated with respective item locations manually by an associate of the facility. For instance, an associate of an example facility may navigate through the facility and, periodically, scan an item on a shelf or other inventory location and send an identifier of this item and an indication of the location in the facility to a backend server. The backend server may then begin to generate the initial planogram data indicating respective locations of a relatively small subset of items offered in the facility. For instance, an associate may utilize a merchant device, such as a scanner, to scan items every six feet or other distance within a facility. In some instances, each scan of an item may be associated with a respective location (e.g., an (X,Y) location) within the facility. This information may be provided by the merchant device (e.g., via a GPS component of the merchant device, via triangulation of the merchant device, etc.), determined by analysis of image data generated at the facility (e.g., via overhead cameras), or in any other manner.

Upon the backend servers receiving an indication of respective locations of identified items in the facility, these servers may store this information as the initial planogram data. In addition, the servers may use this initial planogram data to determine which items are related to the items having the known locations and, thus, are likely near the items having the known locations within the facility. For instance, the servers may determine text data associated with each item having a known location and may compare this text data to text data associated with each item in a catalog of items available in the facility to determine which items are most similar to each respective item. That is, the servers may generate first text data associated with a first item and compare this first text data associated with respective text data associated with respective items available in the facility. The servers may then determine which one or more items are associated with text data that is most similar to the first text data and may store these most-similar items as items that are related to the first item. The servers may then perform a similar process for each item that is associated with a known item location in the facility, as indicated in the initial planogram data.

In some instances, the servers may use a language model to determine the related items. For instance, the servers may generate embedding data based on text data that is associated with each item, with this text data being extracted from an item description associated with an item in an item catalog. The embedding data associated with an item may then be compared with the respective embedding data associated with each other embedding data associated with items (with the embedding data determined from text descriptions in the item catalog) to determine the "top-n" most similar items for a particular item. Further, while this example describes determining similar items based on text similarity, other information may additionally or alternatively be used to make this determination. For instance, the servers may store planogram data associated with other facilities and may use this planogram data for determining the related items. In this example, upon receiving an indication of a first item that is associated with a known item location, the servers may analyze the planogram data associated with other facilities to determine which items are typically nearest the first item in the other facilities.

Returning to the language-model example, envision that an associate of a facility scans a bottle of ketchup in the facility and provides an indication of this item identifier and a location associated with the ketchup in the facility. Upon receiving this information, the servers may store, in the initial planogram data, an indication that instances of the bottle of ketchup is associated with the indicated location. In addition, the servers may determine which item(s) are most related to ketchup using a predefined language model. For instance, the servers may determine first text data associated with the ketchup item from an item catalog (e.g., "fresh", "tomato", "ketchup", "condiment", etc.) and generate first embedding data associated with this first text data. The servers may then input this embedding data into a pretrained language model which is configured to compare the inputted first embedding data to embedding data generated from with text data associated with each other item offered in the facility.

The trained language model may then output an indication of which one or more items are most similar to the bottle of ketchup based on the comparison of the embedding data. In some instances, this output comprise a list of top-n items that are most similar, an indication of each of the top-n similarity scores, and/or the like. In this example, for instance, the language model may output an indication that the bottle of ketchup is most similar to a bottle of mustard, a jar of mayonnaise, and so forth.

Upon determining the items that are most similar to the first item (e.g., ketchup), the servers may store an association between the first item and the related items (e.g., mustard and mayonnaise). The servers may similarly determine the top-n related items for each item having a known item location in the facility from the initial planogram data. After determining the related items for each item having a known item location, the servers may send, to mobile carts in the facility, data indicating these associations such that the mobile cart is able to output information regarding related items based on the current location of the cart. In other instances, meanwhile, the server s may send, to the mobile carts, data indicating associations between locations in the facility and related items. For instance, this data may associate a location of the ketchup to the items related to the ketchup, rather than associating the ketchup itself to the items related thereto.

For instance, the information sent to the cart may indicate that mustard and mayonnaise are the items having the highest similarity to the example ketchup item. Therefore, upon a user placing the example bottle of ketchup into the mobile cart, the mobile cart may identify the ketchup item, identify the related items, and output information regarding the related items. For instance, upon the user placing the bottle of ketchup into the cart, the cart may output information (e.g., on a display of the cart) suggesting that the user consider acquiring the bottle of mustard or the jar of mayonnaise. In another example, the cart may determine its current location, using any of the location-determination techniques described below, and may determine that the related items (e.g., mustard and mayonnaise) are associated with the particular location and, in response, may output the related-item information. That is, the cart may be configured to output the related item information in response to identifying a particular item (e.g., ketchup) or in response to determining that the cart is currently located within a threshold distance of an item location of an item that is associated with the item location.

Furthermore, it is to be appreciated that the servers may send any type of data to the mobile carts in the facility to allow the mobile carts to output the related-item information. For instance, the servers may send data that maps certain anchor items (i.e., items associated with known locations) to the respective related items. For instance, the servers may send data that maps the bottle of ketchup to the bottle of mustard and the jar of mayonnaise. Thus, when the user places an instance of the bottle of ketchup into the cart, the cart may output the related items. In another example, as introduced above, the servers may send data that maps these related items to locations in the facility. For instance, the servers may send data to the cart that indicates that the bottle of mustard and the jar of mayonnaise are associated with an item location that is associated with the bottle of ketchup. Thus, when the cart determines that it is located at a location that is a within a threshold distance of the item location associated with the ketchup, the mobile cart may output the suggestion data associated with the related items.

In some instances, the servers may also update the planogram data based on the similarity calculations. For instance, envision again that an associate scans the bottle of ketchup and provides an indication of this item and its corresponding location to the servers. The servers may then use the similarity-calculation techniques described above to determine the top-n related items, such as the bottle of mustard and the jar of mayonnaise. After doing so, the servers may update the planogram data to associate these related items with the location of the anchor item. That is, the planogram data may be updated to indicate that the location of the ketchup is also now associated with the bottle of mustard and the jar of mayonnaise; or rather, conversely, that these items are now associated with the location of the ketchup in the planogram data.

In the above examples, a mobile cart may determine which item(s) to output information regarding based on determining a current location of the mobile cart, where these items have been determined to be similar (e.g., semantically similar) to an item that is near the current location of the mobile cart. In other instances, meanwhile, similar techniques may be used to localize the mobile—that is, to determine or approximate the current location of the mobile cart. For instance, and as described below, an example mobile cart may include one or more cameras, such as cameras pointed toward a basket of the cart for identifying items placed therein, cameras pointed outwards towards shelves of a facility for generating image data of the items on the shelves, and/or the like. In these instances, the mobile cart may include a component to analyze image data generated by the camera(s) to identify information associated with an item, such as text data written on the item. The cart may then use the semantic model(s) described above to generate embedding data from this text data and input the embedding data into the pretrained language model. The model may then output comprise a list of top-n items that are most similar to this item, an indication of which one or more items having known locations in the planogram are most similar to the identified item. The mobile cart may then use this known item location to determine or approximate the current location of the cart. In some instances, the cart may use the location associated with the most similar item as the approximate current location of the mobile cart, while in other instances the cart may determine, from the model, the top-n number of most similar items having known locations, may determine the locations of each of these top-n items in the planogram, and approximate a current location of the cart using the multiple locations (e.g., as an average location of these locations).

In one example, for instance, the mobile cart may generate image data of the bottle of ketchup on the shelf or as a user of the cart places the bottle of ketchup into the basket of the cart. The cart may identify text data associated with this bottle of ketchup, may generate embedding data using the text data, and may input the embedding data into the pretrained language model, which may have been trained using embedding data computed from text data associated with items having known locations in a planogram. The language model may then output an indication that the bottle of ketchup is most similar to a bottle of mustard, a jar of mayonnaise, and so forth. The cart may then determine a location associated with the bottle of mustard from the planogram and may store this as an approximated location of the cart. Or, the cart may determine a location of the mustard and a location of the mayonnaise, compute an average location using these two known locations, and store this average location as a current location of the mobile cart.

Techniques for determining related items and for determining when to output information associated with these related items are described in further detail below.

In order to achieve the described techniques, the mobile carts (or "smart carts") described herein may include an array of cameras, display, and/or other input and output devices. For instance, an example mobile cart may include one or more cameras, which may have a field-of-view directed substantially upwards towards a ceiling of the facility, substantially downwards towards a floor of the facility, substantially away from a cart and substantially towards an outward environment of the cart (e.g. toward an inventory location that houses one or more items), and/or the like. In some instances, the cart may generate image data using these cameras and may analyze this image data to determine its current location. For instance, the ceiling or the floor of the facility may include unique fiducials that the cart has been trained to identify and use to determine, from a prestored mapping, a current location of the cart. For instance, a camera mounted to a mobile cart may continuously or periodically generate image data of a ceiling that has unique fiducial data printed thereon throughout the facility. In response to generating this image data, the mobile cart, or a computing device (e.g., a remote server) communicatively coupled thereto, may analyze the image data to determine a current location of the cart. In some instances, the cart (or other device) utilizes one or more trained classifiers to determine information regarding the fiducials represented in the image data, and may use this information to determine a current location of the cart. For instance, the cart may determine, based on information from the one or more trained classifiers, that the cart is currently located in a certain section of the facility of multiple sections of the facility or that a cart is located at a certain (X,Y) location in the facility.

Further, it is to be appreciated that the described techniques may be used to localize other apparatuses in addition to mobile carts, such as carry-able baskets, robots, vehicles, and/or the like. Further, while these examples describe one method for localizing the mobile cart, in some instances the cart (or server) may use this information in addition to other information to determine a location of the cart. For instance, the mobile cart may include an RFID reader configured to read RFID tags that are affixed to inventory locations in the facility and associated with respective locations, a GPS sensor to determine a location of the cart, a gyrometer to determine a distance traveled by the cart from a known location, and/or any other type of sensor to determine a current cart location. In another example, the cart may include camera(s) and may analyze image data generated therefrom to identify items with the facility, which may in turn may be used to determine a location by using these items as a key value for reading planogram data associated with the facility.

In some instances described herein, the mobile carts that are configured to determine their respective current location may also comprise item-identifying carts that are configured automatically identify items that the users place in their carts as they move around the material handling facilities, as well as to identify the users operating the carts. Upon identifying a user operating a cart and items placed into the cart, the item-identifying cart may update a virtual shopping cart of the user to represent the items that have been placed in, or removed from, the physical cart. In addition, the item-identifying cart may be configured to output information regarding one or more items that have been deemed related to the item placed into the cart, as introduced above and described in further detail below.

According to the techniques described herein, an item-identifying cart may include one or more first identification cameras positioned on a frame of the cart and directed substantially toward a position typically occupied by a user pushing the cart to generate first image data for identifying the user. For example, the identification image data may represent an identifier associated with an account of the user displayed on a mobile device of the user (e.g., a barcode or the like displayed on a mobile phone), biometric-recognition data representing the user (if the user requests to be identified in this manner), gesture data representing the user, and/or the like. The cart may include components for associating the identification image data with the user, or the cart may send the first image data to one or more remote servers for determining this association.

In addition, the cart may include one or more second identification cameras positioned on the frame of the cart to generate second image data representing items that a user places in the cart, and/or removes from the cart. The cart may include one or more components that analyze the image data to determine an item identifier for the item(s) placed in the cart, or removed from the cart, and update a virtual shopping cart for the user of the cart. Once a user has finished their shopping session, the user may be able to efficiently check-out of the materials handling facility (or "facility") without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual shopping cart of the user that were identified by the cart during the user's shopping session.

In addition, the cart may include one or more proximity sensors for determining when a user is proximate to the cart and when the user is not. In some instances, the cart may be configured to determine when a user is not proximate the cart (e.g., not within a predefined threshold distance of the cart) and, in response, may turn off or otherwise lessen the amount of power consumed by the one or more components of the cart. For instance, the cart may power off or down one or more cameras, a display coupled to the cart, image-processing components configured to analyze image data and identify items and actions represented therein, and/or any other hardware, software, and/or firmware components of the cart. Further, when the cart determines, via the proximity sensors, that the user is again proximate the cart, the cart may power on or up the components previously powered off or down. By selectively powering down or off these components when the user is not within a threshold distance of the cart, the amount of power consumed by the cart is lessened and, thus, a length of time for which the cart may be used prior to recharging a battery of the cart may increase.

In some instances, the cart includes one or more proximity sensors having respective fields-of-view (FOVs) directed towards a basket of the cart, as well as one or more proximity sensors directed towards a handle of the cart used for operating (e.g., moving) the cart. Collectively, the FOVs may enable the proximity sensors to detect when a user is within a threshold distance of the cart, regardless of which side of the cart on which the user is residing. The proximity sensors may comprise optical time-of-flight (ToF) sensors, infrared sensors, ultrasonic sensors, and/or any other type of sensor configured to determine when a user or other object is within a threshold proximity.

Similar to traditional carts, such as shopping carts commonly found at grocery stores or other retail establishments, the item-identifying carts described herein may include a durable frame, including or supporting a basket, made of plastic or metal (often having four sides in a quadrilateral shape), multiple wheel castors configured to allow the cart to move on a surface, and one or more handles for a user to push and/or pull the cart around in a facility. However, the carts described herein may include additional hardware and software components that configure the carts to, among other functions, identify items placed in the carts on behalf of the users, and update virtual carts of the users to automate one or more steps of a traditional shopping experience.

To utilize a smart cart as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or carts, can recognize the user. For instance, the user may have registered to identify themselves to the cart using any identification technique, such as presenting an identification means to the first camera/scanner positioned on the frame of the cart (e.g., presenting a driver's license, presenting a facility-issued card, presenting a user identifier via a mobile phone, etc.), speaking a predefined utterance (e.g., a name of the user, a predefined keyword, etc.), and/or looking into the first camera for facial recognition. Once a user has identified themselves to a smart cart, the user may begin a shopping session where the smart cart identifies and tracks items retrieved by the user and placed in the smart cart.

After the user has moved throughout the materials handling facility and selected the items they desire to purchase or otherwise take from the facility, the user may end the shopping session in various ways. For instance, the user may return the cart to a cart corral, provide input to the cart indicating an end of the shopping session (e.g., utterance, utilize a user interface element on a touch display, etc.), or simply remove their bags or other item carriers from the cart and leave the facility. After the user has ended their shopping session, the list of item identifiers in the virtual shopping cart may be uploaded to one or more remote servers that manage user accounts for users of the facility. The servers may charge the appropriate user account for the listing of the items in the virtual shopping cart that the user took from the facility.

Although some of the techniques described below are performed locally on the cart, in other examples, some or all of the techniques may be performed by one or more backend devices or servers associated with the facility. In addition, while some of the techniques are described as being performed by backend servers, in some instances these techniques may be performed by the cart. The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that includes a user 104 operating a mobile cart 102 in a facility 106. As illustrated, the mobile cart 102 includes one or more imaging devices 112 (or "cameras") configured to generate image data, which the cart 102 may use to determine a current location of the mobile cart 102 within the facility 106. In addition, the mobile cart 102 may determine, using the current location, an item in the facility having a known item location and, thereafter, may determine items that are related to this item for outputting recommendation data to the user 104 operating the cart 102.

In the illustrated example, for instance, the user 104 is currently operating the mobile cart 102 in an aisle 110 of the facility between two racks 108(1) and 108(2). In addition, these racks 108 house three items that are associated with known locations. That is, these racks 108 include an item "Item_ABC" that is associated with a location $(X_1, Y_1)$, an item "Item_DEF" that is associated with a location $(X_2, Y_2)$, and an item "Item_GHI" that is associated with a location $(X_3, Y_3)$. For instance, an associate of the facility may have scanned a barcode associated with these three items and send an indication of these item identifiers and their respective locations to one or more servers 134, as described in further detail below.

Returning to the example of FIG. 1, the mobile cart 102 may generate image data using the imaging devices 112. In some instances, these imaging devices may be oriented towards a ceiling and, thus, may generate image data of the ceiling of the facility 106. In some instances, the ceiling of the facility may include fiducial data printed thereon to enable the mobile cart 102 to determine its location. In this example, the cart 102 may analyze the generated image data to determine its current location and may compare this cart location to respective locations associated with each item associated with a known location. In this example, the cart 102 may determine an approximate distance between each of these items having a known location and may determine that it is to "Item_GHI". In response, the cart may output information regarding items that have been determined to be similar to this item. Continuing the example from above, for instance, if "Item_GHI" comprises a bottle of ketchup, then the cart 102 may output information regarding the jar of mayonnaise and the bottle of mustard.

As illustrated, the cart 102 may include the one or more imaging devices 112, one or more output devices 114 (e.g., a display, speakers, etc.), one or more processors 116, and memory 118. The memory 118 may store a cart-location component 120, a nearest-item component 122, a related-item component 124, a recommendation component 126, and a clustering component 128. In addition, the memory 118 may store planogram data 130 and related-item data 132.

The cart-location component 120 may be configured to determine a current location of the cart 102 in the facility 106. For instance, the cart-location component 120 may be configured to analyze the image data generated by the imaging devices 112 and determine one or more unique fiducial data represented in the image data. The cart-location component 120 may then perform a look-up in a data structure storing associations between fiducial data and respective locations in the facility. While the cart-location component 120 may determine the location of the cart using fiducial data printed on the ceiling, it is to be appreciated that the cart-location component 120 may determine this cart location in other ways.

The nearest-item component 122, meanwhile, may be configured to use the determined cart location to determine which item having a known location is nearest the current cart location. For instance, the nearest-item component 122 may be configured to analyze the planogram data 130 to determine item locations and compare these known item locations to the current cart location. In this example, the nearest-item component 122 may be configured to determine that the cart is currently located a distance "D1" from Item_GHI, a distance "D2" from Item_DEF and a distance "D3" from Item_ABC. The component 122 may then determine that Item_GHI is the closest item relative to the items associated with known locations.

After the nearest-item component 122 determines the nearest known item, the recommendation component 126 may then determine one or more items that are related to this nearest known item and may output recommendation data to the user 104 in response. For instance, the recommendation component 126 may analyze the related-item data 132 to determine which items have been deemed most similar to the nearest known item, in this instance Item_GHI. The recommendation component 126 may then cause the output devices 114 or other output devices, such as a mobile phone of the user 104, to output the recommendation data. For instance, the recommendation data may indicate those items that are related to the Item_GHI, those items that are related to Item_GHI and are on sale, those items that are related to Item_GHI and that are on a shopping list of the user 104, and so forth.

Figure 7:
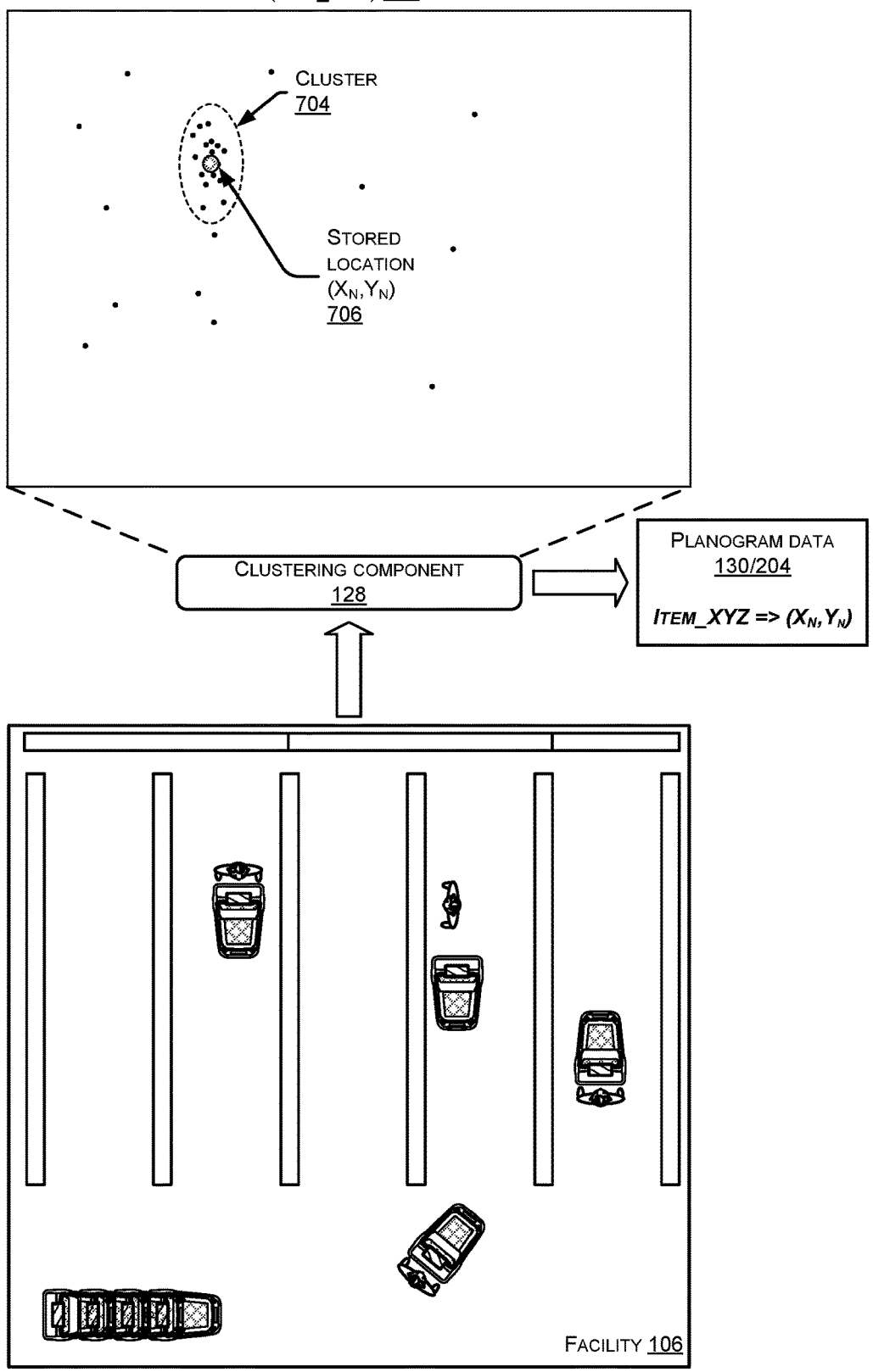
FIG. 7 illustrates an example scenario where a clustering component, operating on the mobile cart or the servers of FIG. 1, receives data indicating, for a particular item, where users have been located within the facility when the item was placed into a respective mobile cart. As illustrated, the clustering component may identify a cluster of these locations and, in response, may assign a location to this item based on this cluster. For instance, the planogram data may be updated to indicate that the particular item is associated with a location corresponding to a centroid of the illustrated cluster.

The clustering component 128, meanwhile, may be configured to generate and/or supplement the planogram data 130 (or planogram data stored remotely, as described further below). In some instance, the clustering component 128 functions to stored indications of the locations that items have been placed into the cart, which in turn may be used to determine respective locations in the facility 106 which to associate with the respective items. For instance, the clustering component 128, and other instances of the component on other carts, may store an indication of a location of the respective cart each time that an instance of a particular item is placed into the respective cart. These locations may then be used to determine a location to associate with that particular item in the planogram data. For instance, an average or other statistical measure of the locations may be determined and stored in association with the particular item. FIG. 7 and a corresponding discussion describes operations of the clustering component in further detail below. Further, while FIG. 1 illustrates the clustering component 128 as residing on the cart 102, it is to be appreciated that in other instances this component may additionally or alternatively reside on the servers 134.

As FIG. 1 further illustrates, the cart 102, and other carts in the facility 106, may communicatively couple over a network 136 to one or more servers 134, which may reside at or remote from the facility 106. The servers 134 may include one or more processors 138 and memory 140, which may store a planogram component 142, a similarity component 144, planogram data 146, and similarity data 148. The planogram component 142 may function to generate the planogram data 146 using one or more techniques. For instance, the planogram component 142 may generate the initial planogram data in response to receiving data from a device operated by an associate of the facility 106. For instance, the associate of the facility may scan an item identifier of an item periodically within the facility and provide an indication of the item identifier and a respective location of the item in the facility 106 to the planogram component. In this example, the associate may have scanned at least an item identifier associated with Item_ABC, an item identifier associated with Item_DEF, and an item identifier associated with Item_GHI. In response to receiving these item identifiers and corresponding item locations in the facility 106, the planogram component 142 may store these associations in the planogram data 146. In addition, the planogram component 142 may update the planogram data 146 as it "learns" additional item locations over time, such as via the clustering techniques introduced above and described below with reference to FIG. 7.

The similarity component 144, may generate the similarity data 148 indicating similarity score between items offered in the facility 106. For instance, the similarity component 144 may determine a similarity between each item having a known location and each other item in an item catalog. To provide an example, the similarity component 144 may determine a respective similarity score between Item_ABC and each other item in the catalog, between Item_DEF and each other item in the catalog, and between Item_GHI and each other item in the catalog. The similarity component 144 may then store this data in the similarity data 148. In some instances, the similarity component 144 may generate this similarity data using text data associated with the respective items. For instance, the component 144 may retrieve, from an item catalog, text data associated with each respective item, generate respective embedding data using this text data, and use a trained language model to compare respective embedding data. The trained model may then output respective similarity scores based on the comparison of the embedding data, and these similarity scores may be stored as the similarity data 148. In some instances, the component 144 may store, for each item, an indication of the top-n items and/or scores that are most similar to the give item.

In some instances, the servers 134 may provide the similarity data 148 to the cart 102 and other carts in the facility 106 such that these carts are able to identify which items are most similar to an item that a cart is nearest and is associated with a known (e.g., Item_GHI in the illustrated example). In other instances, however, the servers 134 may use the similarity data 148 to determine the related-item data indicating which items are related to which anchor items and may send this related-item data to the carts such that the carts simply determine a nearest item and, using the nearest item as a key, determine those items that are near most related to the nearest item. That is, in some instances, the cart 102 may use the similarity data 148 to determine which items are related to a nearest item having a known location, while in other instances the servers 134 may make this determination and may simply provide a listing of the related items to the cart 102. In still other instances, the servers 134 may associate the related items with a location of the nearest known item (e.g., $(X_3,Y_3)$ for the top-n items related to "Item_GHI") and may send data associating locations with related items. Thus, when the cart is determined to be most proximate to $(X_3,Y_3)$ relative to the locations in the store associated with known items in the planogram data, the cart may determine this location, identify the items associated with this location (i.e., the top-n most related items to "Item_GHI") and may output information regarding these items.

Figure 2:
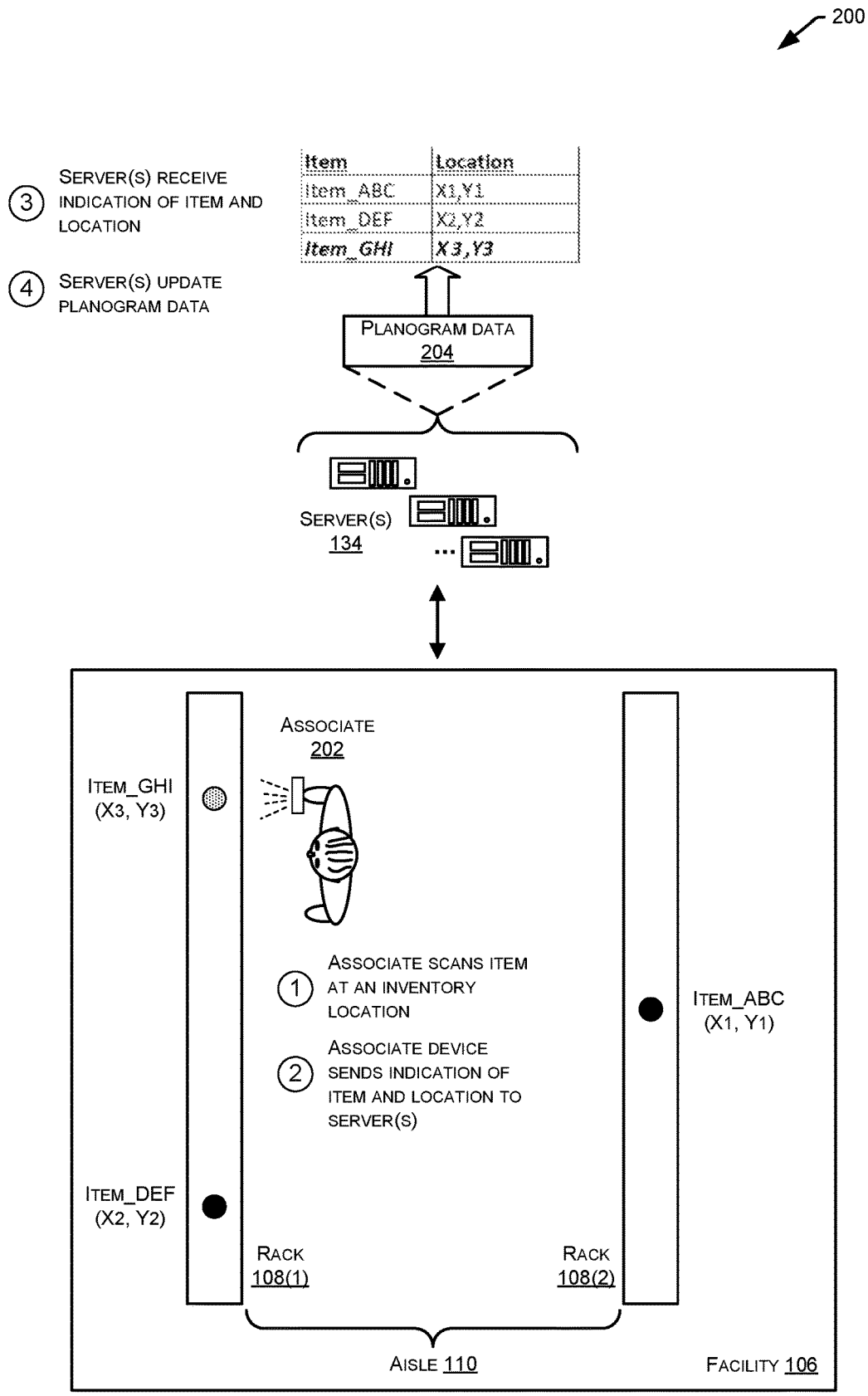
FIG. 2 illustrates an example sequence of operations in which an associate of the facility operates an associate computing device to scan respective item identifiers in order to associate these scanned items with their respective item locations in the facility. The associate device sends indications of the item identifiers and their respective locations to one or more servers, which store these associations as planogram data.

FIG. 2 illustrates an example sequence of operations 200 for generating initial planogram data using a subset of items available in the facility 106, determining items related to the subset of items, and determining when to output recommendation data associated with the related items based on the current location of a cart. At a first operation "1", an associate 202 of the facility operates an associate computing device to scan an inventory item that resides on the rack 108(1). For instance, the associate 202 may use a barcode scanner to scan a barcode of an instance of the item "Item_GHI", may take a picture of the item using a camera, or the like. At an operation "2", the associate computing device sends an indication of the scanned item and an indication of the location of the item to the servers 134. As described above, this operation may comprise the associate 202 manually inputting a location, the associate computing device determining its location in the facility 106, or the like. In other instances, the servers 134 or another computing device may determine the location associated with the scanned item in other ways. For instance, if the facility 106 includes overhead or in-shelf cameras, then the cameras may analyze image data at a time at which the item was scanned to determine the location associated with the item.

At an operation "3", the servers 134 receive the indication of the scanned item and the location of the scanned item. At an operation "4", the servers 134 update planogram data 204 using the received information. Here, for instance, the servers 134 update the planogram data 204 to indicate that the item "Item_GHI" is associated with an example location $(X_3,Y_3)$. As illustrated, the planogram data already indicates respective locations associated with the Item_ABC and Item_DEF, which may have been stored in the planogram data 204 in response to the associate 202 scanning these items previously.

Figure 3:
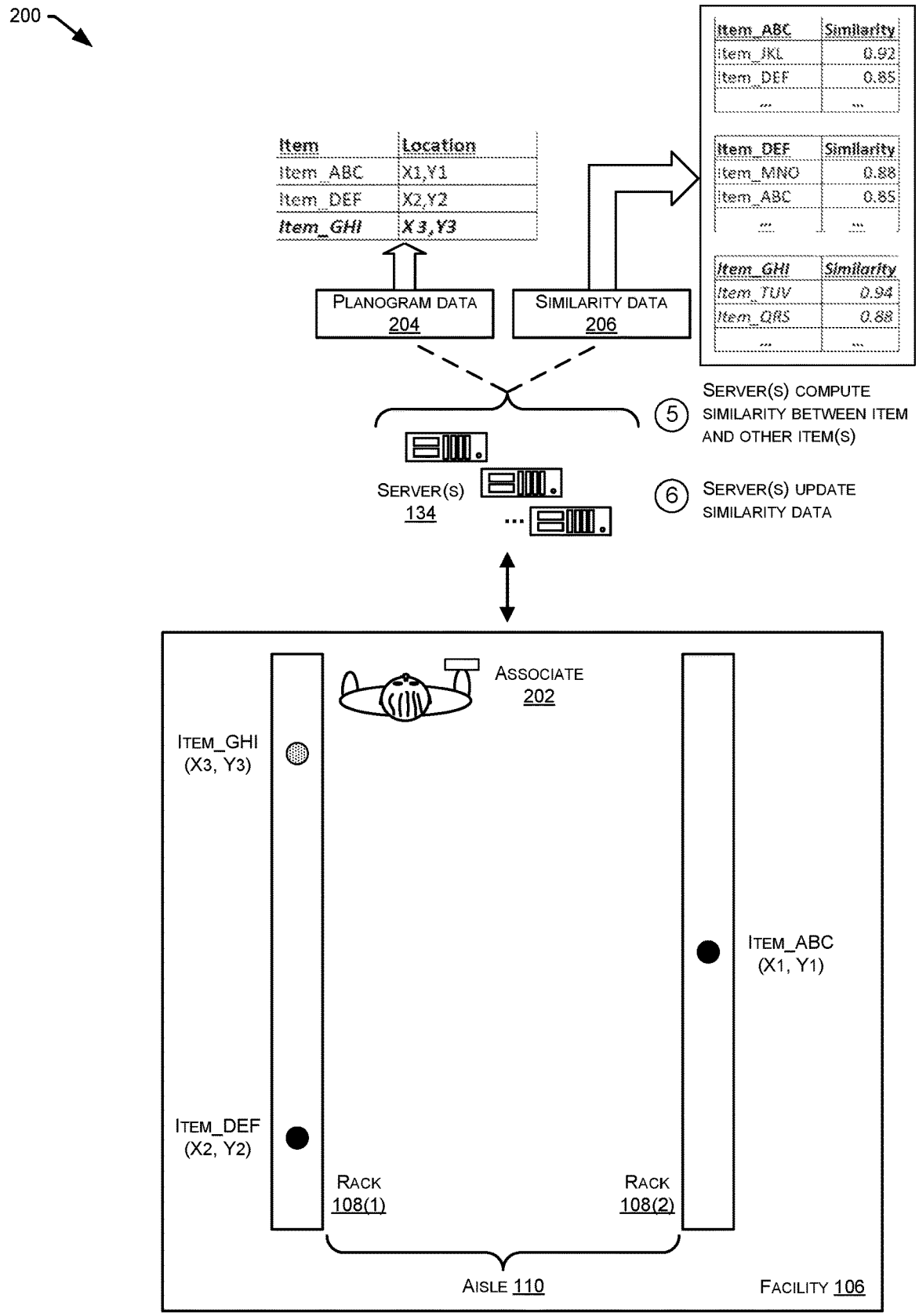
FIG. 3 continues the illustration of the sequence of operations and includes the servers computing, for each item having a known item location, a similarity score between that item each item in an item catalog associated with the facility. In some instances, the servers may use a language model to compute these similarities based on item-description data associated with the respective items.

FIG. 3 continues the illustration of the sequence of operations 200. At an operation "5", the servers 134 may compute a similarity sore between each item having a known item location and each item in an item catalog associated with the facility. For instance, in response to receiving the location information associated with the item "Item_GHI", the servers 134 may calculating a respective similarity score between this item and each other item offered in the facility 106. In this example, the servers 134 have determined that the item "Item_GHI" has a closest similarity to "Item_TUV", a second closest similarity to "Item_QRS", and so forth. Also as illustrated, the servers 134 may calculate and rank similarity scores between the additional items having known locations, such as "Item_ABC" and "Item_DEF".

In some instances, the servers 134 may use a language model to compute these similarities based on item-description data associated with the respective items. For instance, the servers 134 may extract text data associated with "Item_GHI" from an item catalog, computing embedding data using this text data, and compare this embedding data to embedding data generated from respective text data from the catalog associated with the other items. In addition, or in the alternative, the servers 134 may determine the similarity score by comparing a location of "Item_GHI" in planogram data associated with another facility with a respective location of the each other item in the planogram data associated with the other facility. While a few examples are described, the servers 134 may calculate the respective similarity scores in other manners. At an operation "6", the servers 134 update similarity data 206 using the calculated similarity data.

Figure 4:
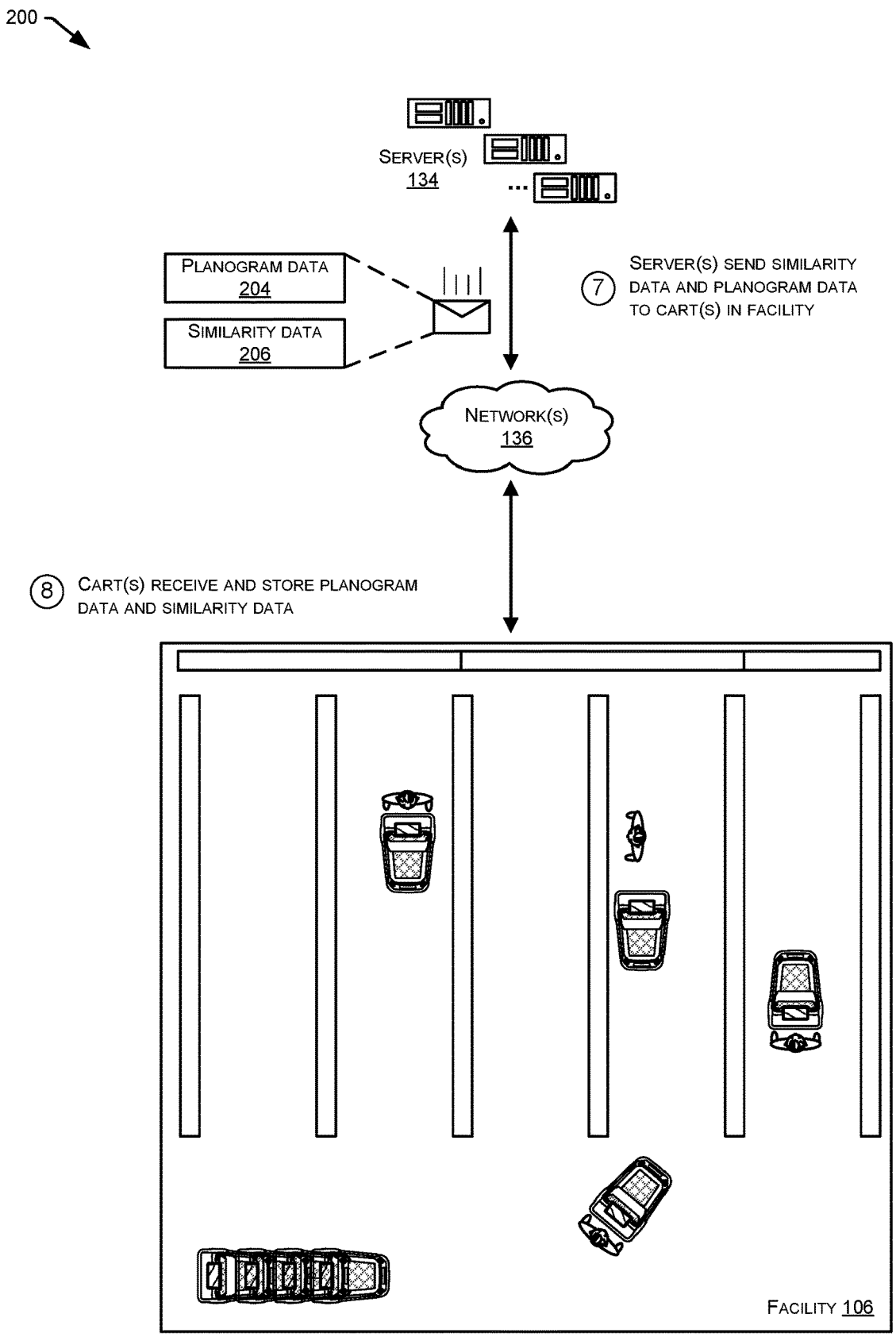
FIG. 4 continues the illustration of the sequence of operations and includes the servers sending the planogram data and the similarity data to each cart in the facility to enable these carts to determine which item they are nearest to at a given point in time and determine which items are most related to the nearest item.

FIG. 4 continues the illustration of the sequence of operations 200 and includes, at an operation "7", the servers 134 sending the planogram data 204 and the similarity data 206 to each cart in the facility 106. At an operation "8", the carts receive and store the planogram data 204 and the similarity data 206. With use of the planogram data 204 and the similarity data 206, the carts are now able to determine which item with a known location they are nearest at a given point in time and determine which items are most related to the nearest item.

Figure 5:
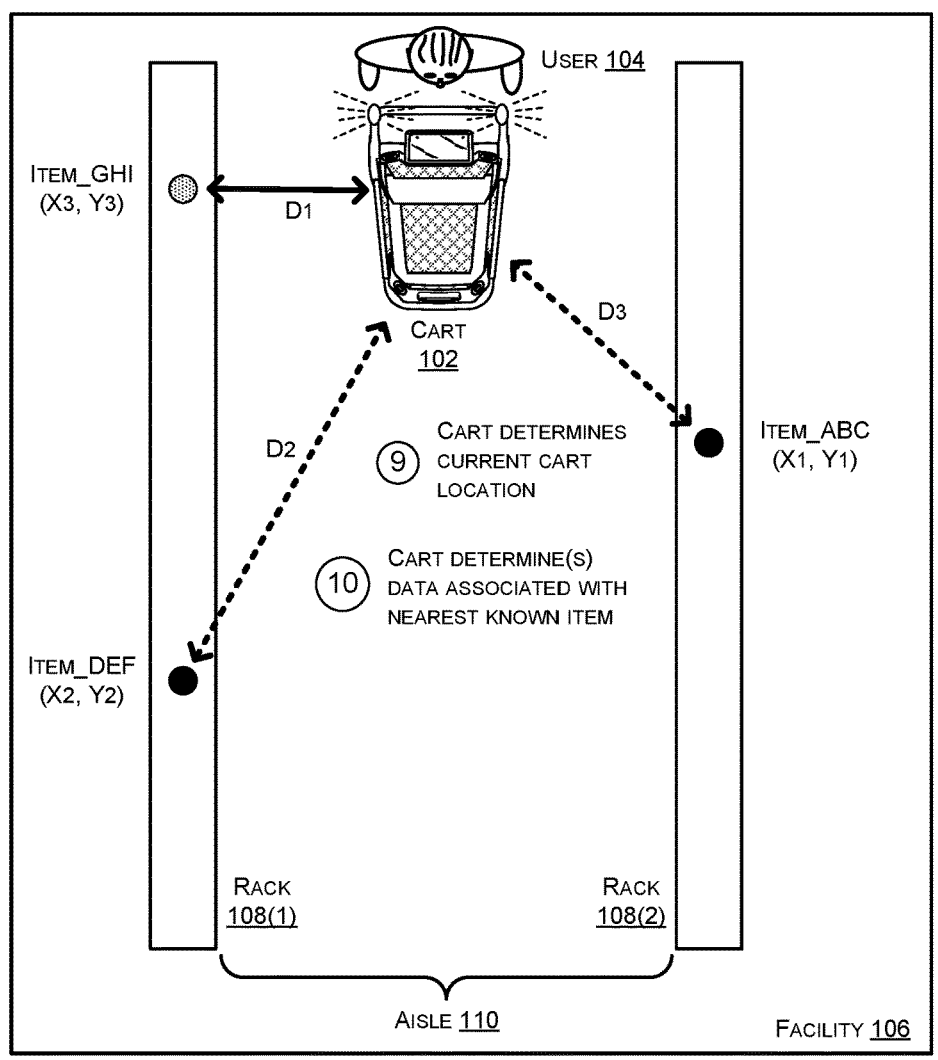
FIG. 5 continues the illustration of the sequence of operations and includes an example mobile cart determining its current location in the facility and determining data associated with a nearest item using the planogram data and its current location.

FIG. 5 continues the illustration of the sequence of operations 200 and includes, at an operation "9", an example mobile cart 102 determining its current location in the facility. For instance, one or more cameras mounted to the cart 102 may generate image data, which the cart 102 may analyze to determine the current location. For instance, the cart may analyze image data of a ceiling or floor representing one or more fiducials printed thereon and may determine the respective locations associated with the unique fiducials. In addition, or in the alternative, the cart 102 may include an RFID reader, which may identify nearby RFID tags. The cart 102 may then determine a location associated with these RFID tag(s) and determine a cart by triangulating these locations. Of course, while a few examples are provided, it is to be appreciated that the cart may determine its location in any other suitable manner.

At an operation "10", the cart 102 may determine data associated with a nearest known item; that is, data associated with an item that is associated with a known location. For instance, the cart 102 may analyze the planogram data 204 to determine an item that represented in the planogram data that is nearest to the current location of the cart.

Figure 6:
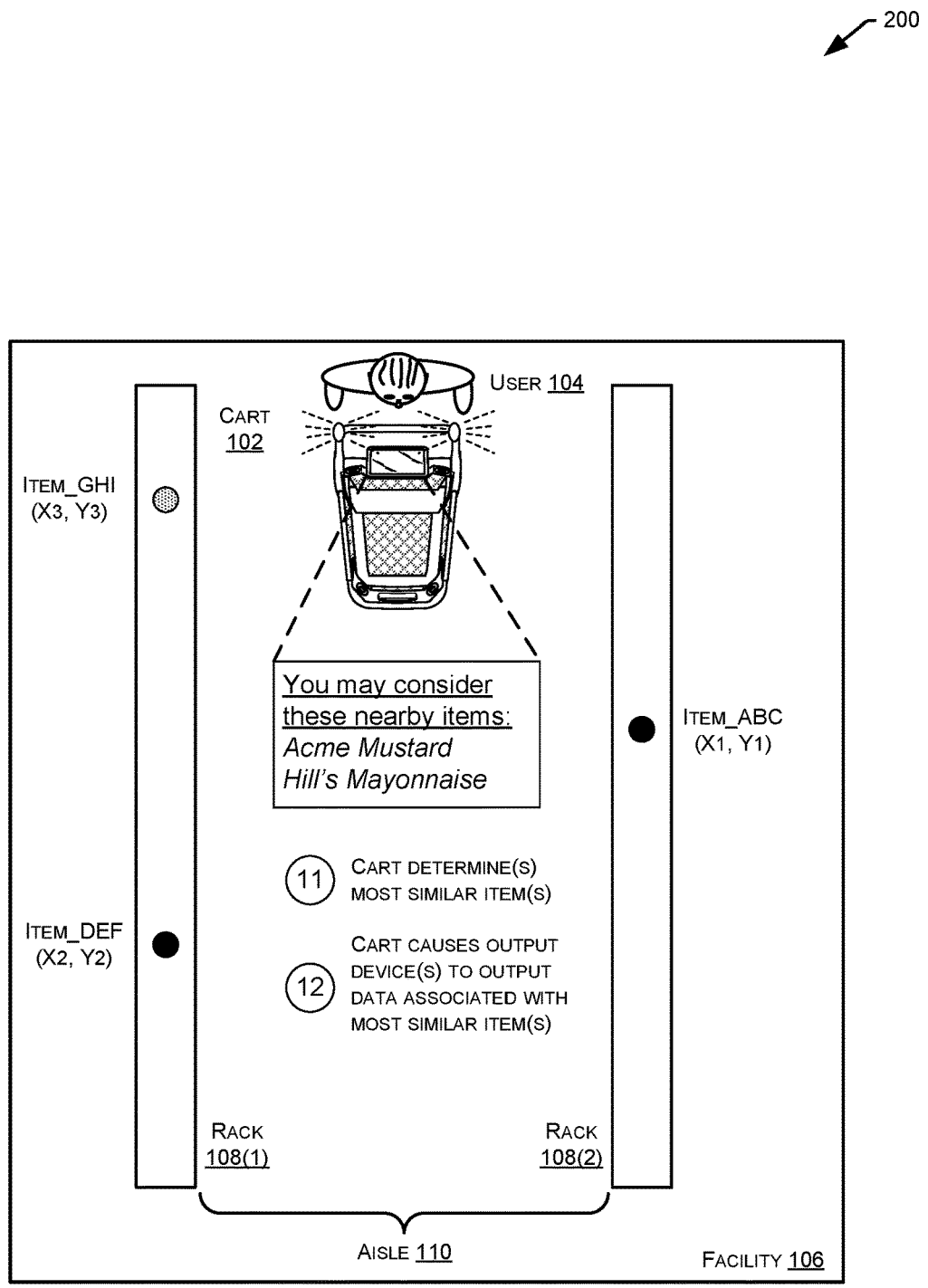
FIG. 6 continues the illustration of the sequence of operations and includes the mobile cart determining, using the similarity data, those items having a highest similarity to the item nearest to the cart and, in response, outputting recommendation data to the user based on this determination.

FIG. 6 continues the illustration of the sequence of operations 200 and includes, at an operation "11", the cart 102 determining one or more items that are most similar to the nearest known item. For instance, the cart 102 may determine, from the similarity data 206, one or more items based at least in part on the similarity scores, such as the top-n items that are most similar to the nearest-known item, the top-n items that are most similar and are on sale, or the like. At an operation "12", the cart 102 may output recommendation data to the user based on this determination. For instance, and as illustrate, the cart 102 may present, on a display of the cart, a recommendation for the items. For instance, if the cart 102 determines that it is currently located near "Item_GHI", which comprises a bottle of ketchup, the cart 102 may analyze the similarity data 206 to determine that "Acme Mustard" and "Hill's Mayonnaise" are the most similar items to the bottle of ketchup (and, potentially, that meet one or more other criteria). Thus, the cart 102 may present recommendation data corresponding to these items in response to the cart determining that it is located near the bottle of ketchup.

In the above sequence of operations 200, the servers 134 compute the initial planogram data 204 and the similarity data 206, and provide this information to the carts in the facility 106. The carts then determine their location (e.g., periodically or in response to a predefined event), determine the item from the planogram data (having a known location) that is nearest to the cart location, determine the items that are most similar to this "anchor item", and output recommendation data to the user based on these similar items.

FIG. 7 illustrates an example of the clustering component 128 introduced above. As noted above, the clustering component 128 may operate on the carts, the servers 134 or a combination thereof. As illustrated, the clustering component 128 may store respective add-to-basket locations 702 where a particular item (here, "Item_XYZ") has been placed into a particular cart. In FIG. 7, for instance, each dot represents a location within the facility 106 where a user placed an item into a cart, as determined by the cart. That is, upon a user placing an item into the cart and the cart identifying the item, the cart may identify the location of the cart at this time and provide it to the clustering component 128. The clustering component 128 may then determine, from the multiple locations 702 at which a particular item has been placed into a cart, a cluster 704 representing the greatest density of data points. That is, the clustering component 128 may apply a clustering algorithm to the add-to-basket locations 702 to determine one or more clusters most represented by the data points. Thereafter, the clustering component 128 may determine a stored location 706 from the cluster 704 to associate with the item. For instance, the clustering component 128 may determine, as the stored location 706, a center of the cluster 704, a weighted center of the cluster 704, or another data point within the cluster 704 to store in association with the item. As illustrated, the clustering component 128, or another component, may update the planogram data 130 or 204 to indicate that the item "Item_XYZ" is associated with the stored location $(X_n, Y_n)$ 706.

In some instances, the clustering component 128 may be used to determine when an item has been moved within the facility 106 or added to an additional location. For instance, if the clustering component 128 initially determines that the item "Item_XYZ" was generally placed into a respective cart near the location $(X_n, Y_n)$ 706, but at a later time other additions of instances of the item appear in a cluster in a different portion of the facility 106 (e.g., near a location $(X_m, Y_m)$), then the clustering component 128 may update the planogram data to indicate this changed location. Further, if the clustering component 128 determines that instances of the item are being placed into carts near both locations $(X_n, Y_n)$ 706 and $(X_m, Y_m)$, then the clustering component 128 may update the planogram data to indicate that the item is associated with both locations.

Figure 8:
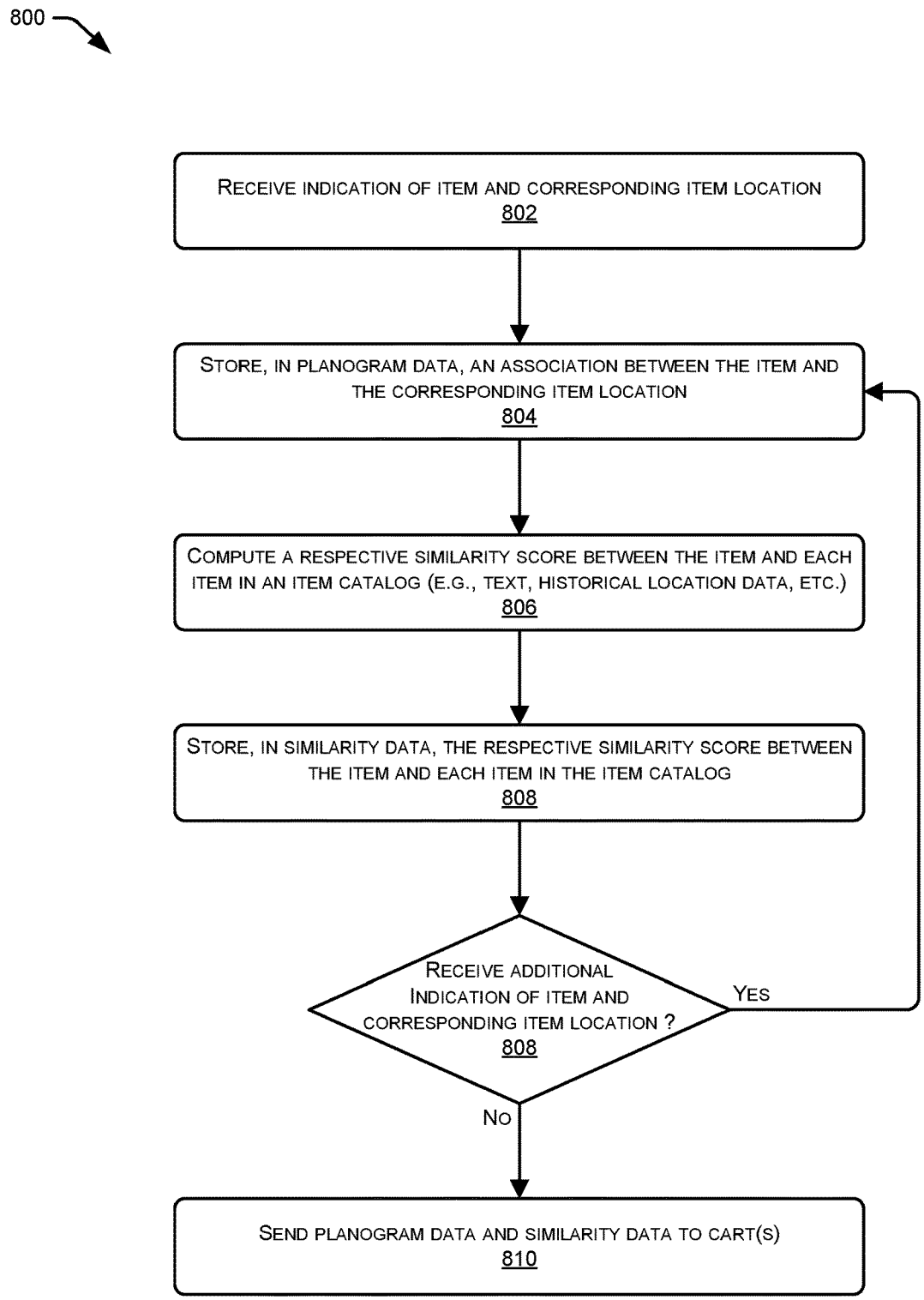
FIG. 8 illustrates a flow diagram of an example process that the servers of FIG. 1 may implement for generating planogram data that stores associations between item identifier and item locations, as well as for generating similarity data that indicates similarities between items having known item locations and other items in an item catalog.

FIG. 8 illustrates a flow diagram of an example process 800 that the servers of FIG. 1 may implement for generating planogram data that stores associations between item identifier and item locations, as well as for generating similarity data that indicates similarities between items having known item locations and other items in an item catalog. This process, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by the servers 134, the cart 102, and/or a combination thereof.

An operation 802 represents receiving an indication of an item and a corresponding item location. For instance, a planogram component 142 of the servers 134 may receive an indication that an associate device has scanned a particular item and provided an indication of the scanned item and a location associated with the scanned item. An operation 804 represents storing, in planogram data, an association between the item and the corresponding item location. For instance, the planogram component 142 may store an indication that the item is associated with a particular location in the facility such that the item and its corresponding location may be used as an anchor item for determining related items.

An operation 806 represents computing a respective similarity score between the item and each item in an item catalog. For instance, the similarity component 144 of the servers 134 may calculate a similarity between the anchor item having the known location to each other item in an item catalog based on text associated with these items, based on historical locations associated with these items, and/or the like. For instance, the similarity component 144 may extract text data associated with an anchor item and then input this embedding data into a model that has been trained using embedding data associated with each other item in the item catalog. The model may then output a similarity score between the anchor item and one or more items, such as a similarity score associated with the top-n most similar items. An operation 810 represents storing, in similarity data, the respective similarity score between the anchor item and each item in the item catalog.

An operation 808 represents determining whether an additional indication of another item and corresponding location has been received. That is, this operation may comprise determining when another item has been scanned and received at the servers along with a corresponding item location. If so, then the process 800 may return to the operation 804 to store this item and location pairing in the planogram data, compute similarity scores using this item, and so forth. If not, then an operation 810 represents sending the planogram data and the similarity data to one or more carts. With use of the planogram data and the similarity data, the carts may determine which anchor item is nearest to a current location of the cart, determine which items are most similar to this anchor item, and output recommendation data based on the item determined to be most similar. In some instances, the carts may determine which of multiple anchor items the cart is currently nearest, determine a set of similar items using each of the multiple anchor items as a key to read the similarity data, and output recommendation data based on these determined similar items. Further, while FIG. 8 describes sending the planogram data and the similarity data to the carts, in some instances, the servers may generate and send data that associates respective locations in the facility with items to output recommendation data regarding.

That is, rather than require the cart to perform the operations of determining a nearest anchor item and determining those items that are most similar to the anchor item, the servers may perform this analysis and may generate and send data that associates cart locations with items to recommend.

Figure 9:
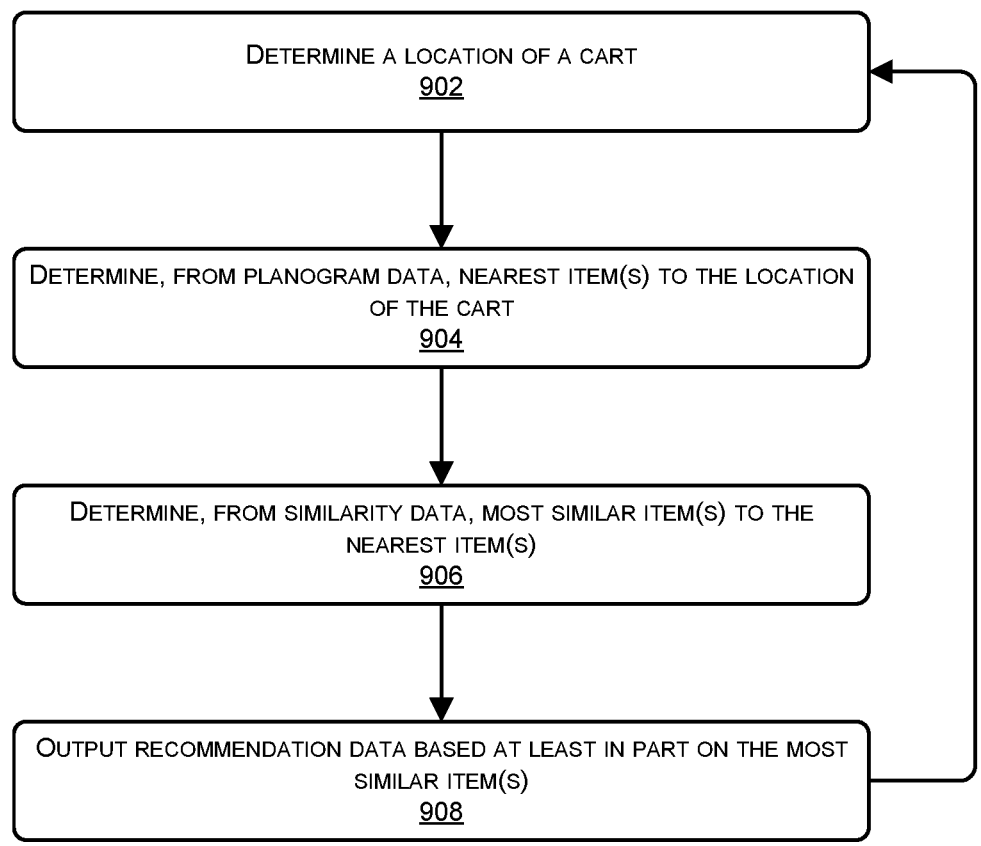
FIG. 9 illustrates a flow diagram of an example process that the mobile cart of FIG. 1 may implement for determining its current or recent location, determining at least one item nearest this location, determining one or more items related to this nearest item(s), and outputting recommendation data based at least in part on these related items.

FIG. 9 illustrates a flow diagram of an example process 900 that the mobile cart 102 may implement for determining its current or recent location, determining at least one item nearest this location, determining one or more items related to this nearest item(s), and outputting recommendation data based at least in part on these related items.

An operation 902 represents determining a location of a cart. As described above, this operation may comprise the cart generating image data and analyzing the image data to determine its current location. For instance, the cart may identify unique fiducial data from the image data and determine a location of the cart based on this fiducial data. An operation 904 represents determining, from planogram data, one or more items that are nearest to the cart location and that are associated with a known location. For instance, upon determining the location of the cart in the facility, the cart may determine which one or more items in the planogram data are closest to this cart location.

An operation 906 represents determining, from similarity data, those items that are most similar to the item(s) having the known location(s) that is closest to the current location of the cart. This operation may comprise inputting text data (or embedding data computed therefrom) associated with the item(s) having the known location into a pretrained language model and receiving, as output of the model, an indication of the most similar items. In some instances, this comparison is done offline and beforehand and, thus, the operation of determining the most similar items may be determined using a precomputed list of item similarities. Further, while the text data associated with the item(s) having a known location(s) may be retrieved from an item catalog, in other instances, this text data may be determined from analyzing image data generated by the cameras of a mobile cart that is at or near the location of this item(s).

An operation 908 represents outputting recommendation data based at least in part on the most similar items. For instance, the cart may output, on a display of the cart, recommendation data for the identified most-similar items. While the process 900 describes the cart determining the nearest anchor item, determining the most similar items to this anchor item, and outputting recommendation data corresponding to these most similar items, in other instances the cart may determine its location and output recommendation data directly based on this location. That is, the servers may perform the operations for determining anchor items that are associated with respective locations in the facility and determining the most similar items to these anchor items and may send, to the cart, data indicating which items to output based on different locations of the cart within the facility. That is, the servers or the cart may perform the operations 904 and/or 906.

Figure 10:
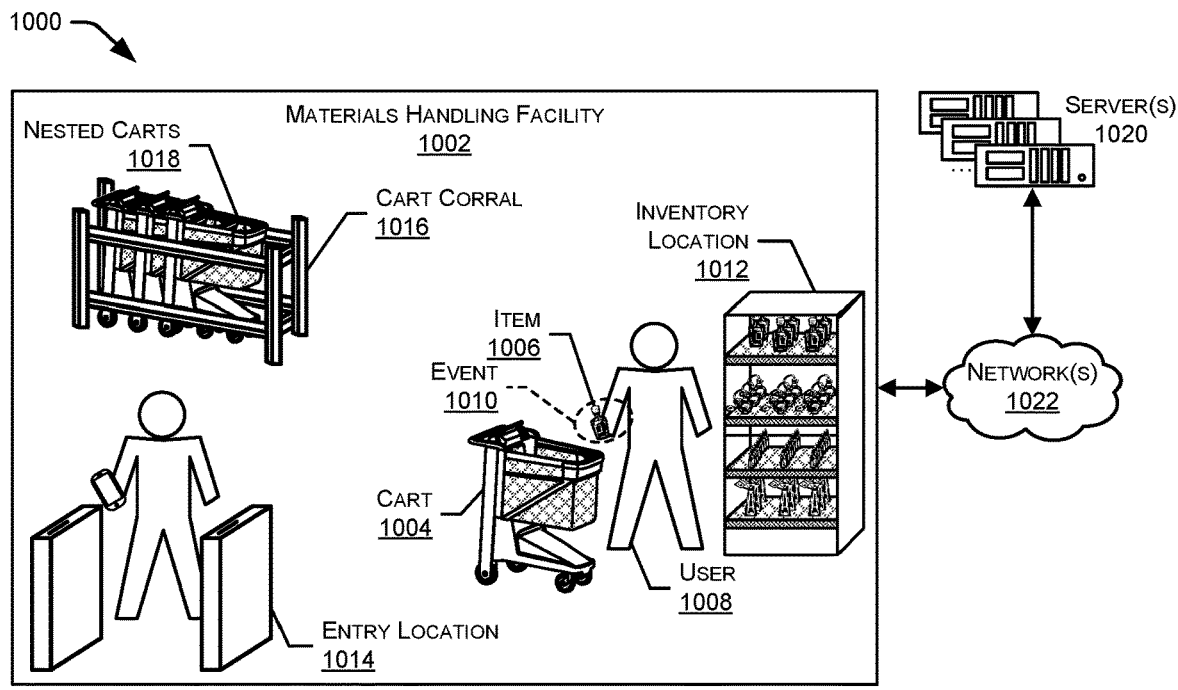
FIG. 10 illustrates an example environment of a materials handling facility that includes an item-identifying cart to identify items placed in, and removed from, a basket of the cart by a user. The cart may also be configured to determine its location, determine a nearest item, determine related items, and output recommendation data using the techniques described with reference to FIGS. 1-9.
Figure 10:
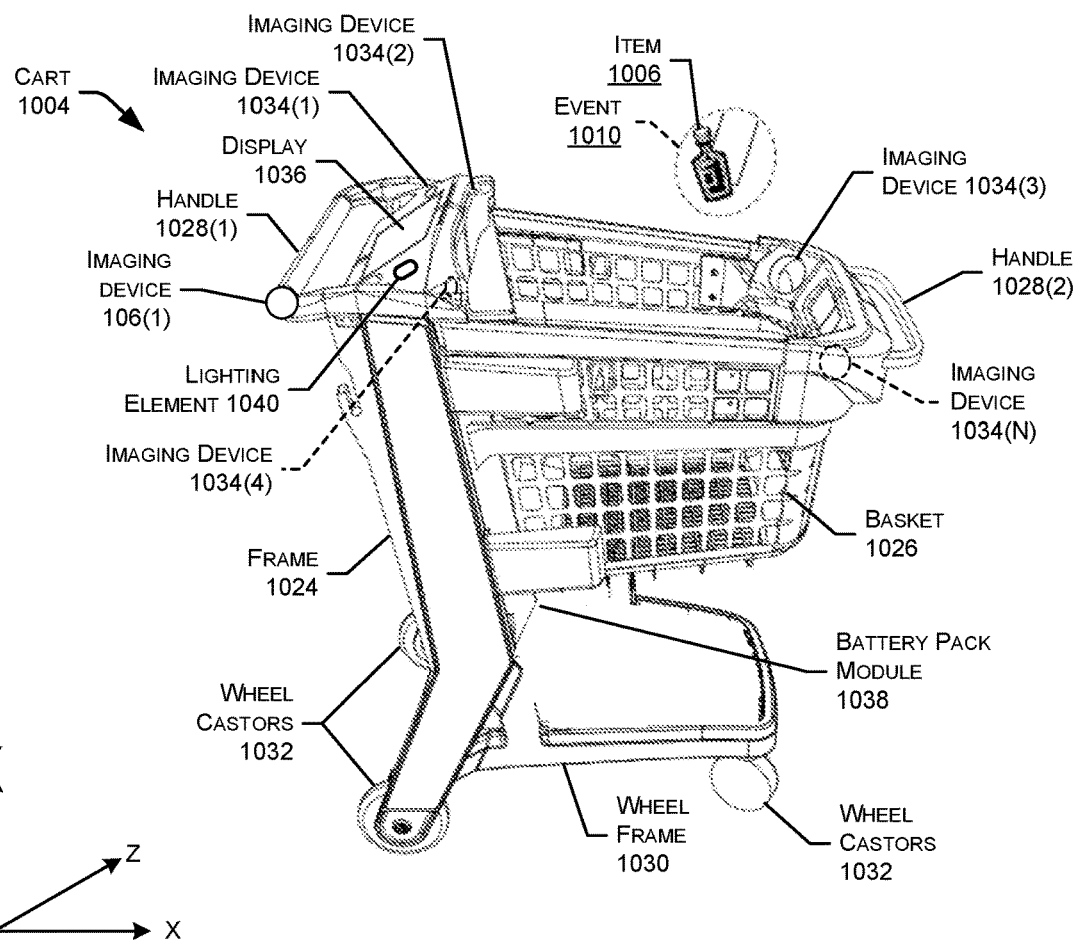

FIG. 10 illustrates an example environment 1000 of a materials handling facility 1002 that includes an item-identifying cart 1004 to identify items 1006 placed in, and removed from, a basket of the cart 1004 by an example user 1008. In some instances, the cart 1004 corresponds to the cart 102 described above. In addition to identifying and analyzing image data for determining a location of the cart, the cart 1004 may generate first image data for identifying a user and generate second image data depicting the item 1006. In addition, the cart may analyze the second image data to identify an item identifier for the item 1006, determine the event 1010 involving the item (e.g., add to cart, remove from cart, multiple items, quantity of items, etc.) and update a virtual shopping cart associated with the identified user 1008 using the item identifier.

As FIG. 10 depicts, the user 1008 may have engaged in a shopping session in the materials handling facility 1002. For instance, the user 1008 may have selected an item 1006 from an inventory location 1012 (e.g., shelf, aisle, etc.) and placed the item 1006 in the cart 1004 (e.g., shopping cart). The inventory location 1012 may house one or more different types of items 1006 and the user 1008 may pick (i.e., take, retrieve, etc.) one of these items 1006.

As illustrated, the materials handling facility 1002 (or "facility") may have one or more entry locations 1014, such as lanes. The entry location 1014 may be defined by a gate in some examples and may include a movable barrier to control movement of users 1008. For example, the gate may include computer-controlled panels that may be closed to impede passage of the users 1008 or opened to permit passage of the user 1008. Upon entering a facility 1002, a user 1008 may desire to utilize a cart 1004 for their shopping session to transport items 1006 around the facility 1002 during their shopping session. In such examples, the user 1008 may approach a cart corral 1016, or other locations, at which carts 1004 are stored. In some examples, the cart corral 1016 may comprise a structure, such as an aisle, for storing nested carts 1018.

Generally, two or more of the carts 1004 may be configured to nest or otherwise functionality join with one another, so that the carts 1004 may be easily stored in a cart corral 1016, and/or transported in bulk. In some examples, the cart corral 1016 may provide additional functionality beyond storage. For instance, the cart corral 1016 may facilitate charging of the nested carts 1018 that are in the cart corral 1016. For instance, the cart corral 1016 may have various electrical contacts extending along the length of a horizontal and/or vertical member of the corral 1016 that, when placed in electrical contact with an electrical contact of the nested carts 1018, charge one or more batteries of the nested carts 1018. In other examples, power cords may extend from the cart corral 1016 that may be plugged into the nested carts 1018 to recharge batteries of the nested carts 1018 while not in use.

In some instances, as described above, each of the nested carts 1018 may reside in a low-power (e.g., deep-sleep) state when in the cart corral 1016. For instance, proximity sensors of the cart may detect an object (e.g., another cart) very near and, in response, may cause the respective cart to enter the low-power state. In addition, or in the alternative, each cart may include a mechanical switch that may be actuated when placed into the cart corral 1016, resulting in the cart entering the low-power state. In still other instances, when the cart corral 1016 includes the electrical contacts to contact with corresponding contacts of the nested carts 1018, each cart may use this signal to cause the cart to enter the low-power state. Of course, while a few examples are provided, the carts may enter the low-power state in any number of ways when nested with other carts in the corral 1016.

To utilize a cart 1004, a user 1008 may approach an unused cart that is not currently engaged in a shopping session (e.g., a nested cart 1018), and interact with the unused cart 1004 to identify themselves to the cart 1004 and begin a shopping session. For instance, the carts 1004 may include a first imaging device 1034(1) (e.g., an image sensor such as a camera, photodetector, or other sensing apparatus designed to read a one or two-dimensional barcode) such that when a user 1008 presents a user device, or portion thereof, such as the display, to the imaging device 1034(1), the cart 1004 may identify the user and corresponding user account for a shopping session. Other types of interaction may be performed by a user 1008 to identify themselves to a cart 1004 (e.g., uttering a name or other keyword to identify the user 1008, presenting the user's face for facial recognition, typing in a password or other user information into a display of the cart 1004, and/or any other type of user identification technique).

Further, in some instances the cart 1004 may transition from a low-power state to a higher-power state in response to the user approaching the cart 1004 and/or removing the cart 1004 from the corral 1016. For instance, the imaging devices 1034 and/or the proximity sensors may identify the user approaching (e.g., entering within the threshold distance of the cart 1004) and, in response, may cause the cart to enter the higher-power state by, for example, powering on and/or up one or more components that were previously powered off and/or down. In another example, removing the cart 1004 from the corral 1016 may cause the mechanical switch to trip or may cause the electrical contacts of the corral 1016 to become uncoupled from the contacts of the cart 1004, resulting in the cart entering the higher-power state. Again, while a few examples are provided, it is to be appreciated that the cart may transition from a low-power state to a higher-power state in response to being removed from the corral 1016 and/or in response to a user approaching the cart 1004 in any number of other ways.

Once a user has identified themselves to the cart 1004, the item-identifying functionality of the cart 1004 may be activated such that subsequent items 1006 placed in the cart 1004 will be identified by the cart 1004 and added to a virtual shopping cart for the user 1008. As illustrated, a user 1008 may move the cart 1004 around the facility 1002 to one or more inventory locations 1012. The user 1008 may retrieve items from the inventory location 1012 and place the items 1006 in the cart 1004. Additionally, the user 1008 may retrieve items 1006 from the cart 1004 and put the items 1006 back in an inventory location 1012, such as when the user 1008 changes their mind regarding their desire to purchase or otherwise acquire the item 1006. The cart 1004 may include various components for identifying item identifiers corresponding to the items 1006 placed in the cart and maintaining a virtual shopping cart for the shopping session of the user 1008.

Once the user 1008 has finished their shopping session, the user 1008 may end the shopping session in various ways. For instance, the user 1008 may return the cart 1004 to the cart corral 1016, provide input to the cart 1004 indicating an end of the shopping session (e.g., utterance, utilize a user interface element on a touch display, etc.), or simply remove item bags or other item carriers from the cart 1004 and leave the facility 1002. After the user 1008 has ended their shopping session, the list of item identifiers in the virtual shopping cart may be uploaded to one or more remote servers 1020, over one or more networks 1022, that manage user accounts for users 1008 of the facility 1002. The server(s) 1020 may charge the appropriate user account for the listing of the items in the virtual shopping cart that the user took from the facility 1002. For instance, the server(s) 1020 may be configured to determine or generate information indicative of a cost of the items 1006 picked by the user 1008. Additionally, the server(s) 1020 may store payment information (e.g., credit card information, bank account information, etc.) for each user account. In this way, when the user 1008 finished their shopping session and the cart 1004 sends the listing of item identifiers in the virtual shopping cart over the network(s) 1022 to the server(s) 1020, the server(s) 1020 may be configured to determine a cost or price for all of the listed item identifiers, and charge the user via their payment information for the items 1006 selected during their shopping session. In this way, the user 1008 need not go through steps of a traditional check-out experience (e.g., waiting in line for a cashier, scanning items with the cashier, paying for items at the cashier, etc.).

The network(s) 1022 may include private networks such as an institutional or personal intranet, public networks such as the Internet, or a combination thereof. The network(s) 1022 may utilize wired technologies (e.g., wires, fiber optic cable, and so forth), wireless technologies (e.g., radio frequency, infrared, acoustic, optical, and so forth), or other connection technologies. The network(s) 1022 is representative of any type of communication network, including one or more of data networks or voice networks. The network(s) 1022 may be implemented using wired infrastructure (e.g., copper cable, fiber optic cable, and so forth), a wireless infrastructure (e.g., cellular, microwave, satellite, etc.), or other connection technologies.

The cart 1004 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 1022 according to the type of protocol or standard being used. As noted above, in some examples, the servers 1020 may perform some or all of the operations described below as being performed by the cart 1004. While the servers 1020 are illustrated as being in a location outside of the facility 1002, in other implementations, at least a portion of the servers 1020 may be located at the facility 1002.

As illustrated, the cart 1004 may generally include or be formed of a frame 1024, a basket 1026, a first handle 1028(1) for pushing the cart 1004, a second handle 1028(2) for pulling the cart, a wheel frame 1030, and one or more wheel castors 1032 to enable movement of the cart 1004 on a surface. The frame 1024, the basket 1026, the handles 1028, and the wheel frame 1030 may be formed from any suitable materials such as plastics, wood, metals, composites or any other combinations of materials. Moreover, frame 1024, the basket 1026, the handle 1028, and the wheel frame 1030 may take any form.

The basket 1026 may generally be part of the frame 1024 and/or supported by the frame 1024 (e.g., be welded, fused, adhered, bolted, screwed, molded, or otherwise joined to the frame 1024). In some examples, the basket 1026 may comprise a grid or lattice-like structure (e.g., a honeycombed arrangement or framework) having one or more bars or members that are welded, fused, adhered, bolted, screwed, molded, stitched or otherwise joined in a substantially perpendicular alignment with respect to one another. The basket 1026 may generally be any shape that defines an interior cavity, or receptacle, for receiving items 1006 that are placed in the cart 1004. The basket 1026 may comprise a bottom, multiple sides protruding from the bottom, and a top. As illustrated, the bottom basket 1026 may be in the shape of a quadrilateral such that there are four sides protruding from the bottom of the basket 1026. Similarly, the top of the basket 1026 may be defined according to the quadrilateral shape and have a perimeter with four corners. The perimeter of the top of the basket 1026 may define an opening to the interior cavity (or receptacle) of the basket 1026 to receive items placed inside the basket 1026. In various examples, the perimeter of the top of the basket may be disposed in a substantially horizontal plane (e.g., a plane substantially along the x-axis as illustrated), and the frame 1024 may include at least one vertical member that extends downward from the basket 1026 to the wheel frame 1030 along a substantially vertical plane (e.g., a plane substantially along the y-axis as illustrated).

The wheel frame 1030 may support one or more wheel castors 1032 to enable movement of the cart 1004 along a surface. The wheel casters 1032 include one or more wheels, axles, forks, joints or other components which enable the cart 1004 to travel on various surfaces. For example, in some implementations each of the wheel casters 1032 may include a single wheel provided on an axle within a fork, or two or more wheels provided on such an axle. In some other implementations, the wheel casters 1032 may include two or more axles. Alternatively, in still other implementations, a single caster may be provided in lieu of the multiple wheel casters 1032 shown in FIG. 10. In accordance with the present disclosure, the wheel casters 1032 may operate in any manner, such as being configured to pivot or swivel, and thus automatically adjust or align with a direction of travel. In some examples, the cart 1004 may be equipped with other apparatuses for enabling the cart 1004 to travel on solid surfaces, including one or more wheeled components other than casters, including but not limited to omnidirectional wheels, spherical wheels or other like apparatuses. Additionally, in some other implementations, the cart 1004 may include two or more skis or other runners for traveling on smooth surfaces. In still other implementations, the cart 1004 may be levitated, e.g., by magnetic levitation through the use of one or more linear induction motors. Moreover, the cart 1004 may be propelled or pushed by humans or autonomous mobile robots or, alternatively, by one or more motors (e.g., electric-powered or gasoline-powered).

As illustrated, the cart 1004 may include a first imaging device 1034(1), for identifying a user operating the cart as described above, and additional, second imaging devices 1034(2), 1034(3), 1034(4) . . . , 1034(N) that include components for use in identifying items placed in the basket 1026 and removed from the basket 1026. The imaging device 1034(1) may, in some instances, be positioned in a manner such that an FOV of the imaging device 1034(1) is away from the basket 1026 and substantially towards the first handle 1028(1) where a user may typically operate the cart 1004. The imaging devices 1034(2)-(N) may be positioned at any location on the cart 1004 (e.g., in the basket 1026, on the basket 1026, mounted to the frame 1024, mounted to the basket 1026, and/or any other location), oriented to have respective FOVs for identifying events that occur within and proximate to the basket 1026. In some examples, the cart 1004 may include at least four of the second imaging devices 1034(1), 1034(2), 1034(3), and 1034(N) that are disposed or coupled proximate to four corners of the top of the basket 1026. In some examples, one or all of the components of the second imaging devices may be disposed internal to the form factor of the basket 1026 and/or frame 1024, at least partially internal to the form factor of the basket 1026 and/or frame 1024, and/or entirely external to the form factor of the basket 1026 and/or frame 1024 (e.g., mounted to the cart 1004). However, in the illustrated example, the second imaging devices may be disposed at locations proximate to the four corners of the top or perimeter of the basket 1026/frame 1024. In some instances, the less that the second imaging devices protrude from the form factor of the cart 1004, the more efficiently the carts 1004 may be nested with respect to each other.

As described in further detail below with respect to FIG. 11, the cart 1004 may further include one or more one light sources (e.g., LED) for emitting light at or prior to the time of the second imaging devices generating the second image data. The cart 1004 may further include, in some instances, one or more proximity sensors (e.g., ToF sensor, PIR sensor, etc.). In some examples the proximity sensors may be activated to detect the proximity of users, objects above the top of the basket 1026, and/or other objects. The proximity sensors may be configured to generate sensor data that indicates distances between objects above the top of the basket 1026 of the cart 1004 and the second imaging devices. The cart 1004 may include components configured to analyze the sensor data and determine that an item 1006 is within some threshold distance from the top of the basket 1026 and/or within the basket 1026. Upon detecting an object within the threshold proximity of the basket 1026 using the proximity sensor, one or more components of the cart 1004 may cause the light sources (LEDs) to emit light and the second imaging devices to generate image data. In some examples, the FOVs of the second imaging devices 1034(2)-(N) may each at least partially overlap at a location above the top of the basket 1026 corresponding to a centroid of the quadrilateral defining the top of the basket 1026. The light sources may illuminate the basket 1026 and/or the area above the top of the basket 1026 to illuminate items 1006 being placed in the cart 1004, or removed from the cart 1004, to act as a "flash" for the cameras that are generating image data. The second imaging devices may generate image data for a predefined period of time and/or until the proximity sensors (or the image data itself) indicates that there is no longer an object within the threshold distance from the cart 1004 or top of the cart 1004.

After generating the image data, one or more components of the cart 1004 may process the image data to determine an item identifier for the item(s) 1006 represented in the image data, and an event 1010 for the image data (e.g., addition of an item 1006 to the cart, removal of an item 1006 from the cart). As described in more detail below, the cart 1004 may include component(s) to determine an item 1006 identifier for the item 1006 (e.g., name of the item 1006, SKU number for the item 1006, etc.), and determine if the item 1006 is being taken from the cart 1004, or added to the cart 1004, based on the motion of the item 1006 and the result of the movement around the cart 1004 once movement is no longer detected and represented by the image data. The components of the cart 1004 may then update a virtual shopping cart associated with the cart 1004 that indicates a virtual listing of items 1006 taken by the user 1008 from the facility based on the determined event 1010. In some examples, the image data may be transmitted to the server(s) 1020 over the network(s) 1022 where the processing may be performed.

In various examples, the cart 1004 may include a display 1036 to present various information in user interface(s) for the user 1008 to consume. In some examples, the display 1036 may comprise a touch screen to receive input from the user 1008 (e.g., a selection of an item identifier to disambiguate amongst potential item identifiers). In some instances, the display 1036 may present customized information to the user 1008 upon identifying the user 1008, such as a shopping list of the user or the like. In addition, the display 1036 may present the recommendation data, discussed above with reference to FIG. 1-9.

The cart 1004 may further include a battery pack module 1038 that houses one or more batteries to power the components of the cart 1004. The battery pack module 1038 may include rechargeable batteries. In some examples, the battery pack module 1038 may be detachably coupled to the wheel frame 1030 and/or the frame 1024 of the cart 1004 such that the battery pack module 1038 may be removed and taken to a charging station. In various examples, the battery pack module 1038 may include rechargeable batteries that may be charged when the cart 1004 is placed in a cart corral 1016 (e.g., through electrical contacts, power cords, etc.). In various examples, the frame 1024 and/or basket 1026 may have one or more channels (e.g., grooves, holes, paths, tunnels, etc.) through which power cables/cords may pass. In this way, power cables may be run at least partially through the channels in the frame 1024 and/or basket 1026 inconspicuously to provide power to the various components of the cart 1004.

In some instances, the cart 1004 may further include one or more lighting elements 1040 disposed on the frame 1024 and/or basket 1026 of the cart 1004. The user 1008 may, in some instances, operate a controller to turn on (and off) the lighting element(s) 1040 to cause the lighting element(s) to emit light. Further, in some instances the controller may enable the lighting element(s) 1040 to transition between multiple light states, such as different colors, flashing effects, and/or the like. The controller operable by the user 1008 may comprise functionality accessible to the user 1008 via the display (e.g., one or more soft buttons for turning on and/or off the light), a physical toggle switch on the frame 1024 of the cart 1004, and/or the light. Further, the lighting element(s) 1040 may be used to signal a predefined state of the cart 1004 and/or the user 1008. For example, the user 1008 may turn on the lighting element(s) 1040 to indicate that he or she requests assistance from an associate of the facility 1002, or for any other reason. In some instances, in response to the user 1008 operating a controller to request assistance, the cart 1004 may perform one or more actions in addition to turning on the lighting element(s) 1040. For example, the display may present content responding to this request, such as an offer to connect the user 1008 with an associate of the store (e.g., in person, via I/O devices of the cart, etc.). For example, in response to requesting assistance, the cart 1004 may facilitate an audio-only or an audio/video call between the user 1008 and an associate of the facility using one or more I/O devices on the cart, such as the display, one or more speakers, one or more microphones, one or more cameras pointed toward the user 1008 and/or the like.

In still other instances, associates of the facility may, remotely or otherwise, operate the lighting element(s) 1040 to change states (e.g., turn on or off) and/or the cart 1004 may include components to automatically change a state of the lighting element(s) 1040. For example, upon the card identifying that an item of a predefined class of items has entered the basket, the cart 1004 may cause the lighting element(s) 1040 to change state (e.g., from an off state to an on state) to indicate that an additional checkout workflow may now be required. For example, if the user 1008 places an item into the basket 1026 that requires the purchasing user to be of a certain age (e.g., alcohol) or to have a certain prescription (e.g., medicine), the cart 1004 may illuminate the lighting element(s). In some instances, the cart 1004 may include a lighting element on a right side of the frame, a lighting element on a left side of the frame, and/or one or more other lighting elements in other locations on the cart 1004.

Figure 11:
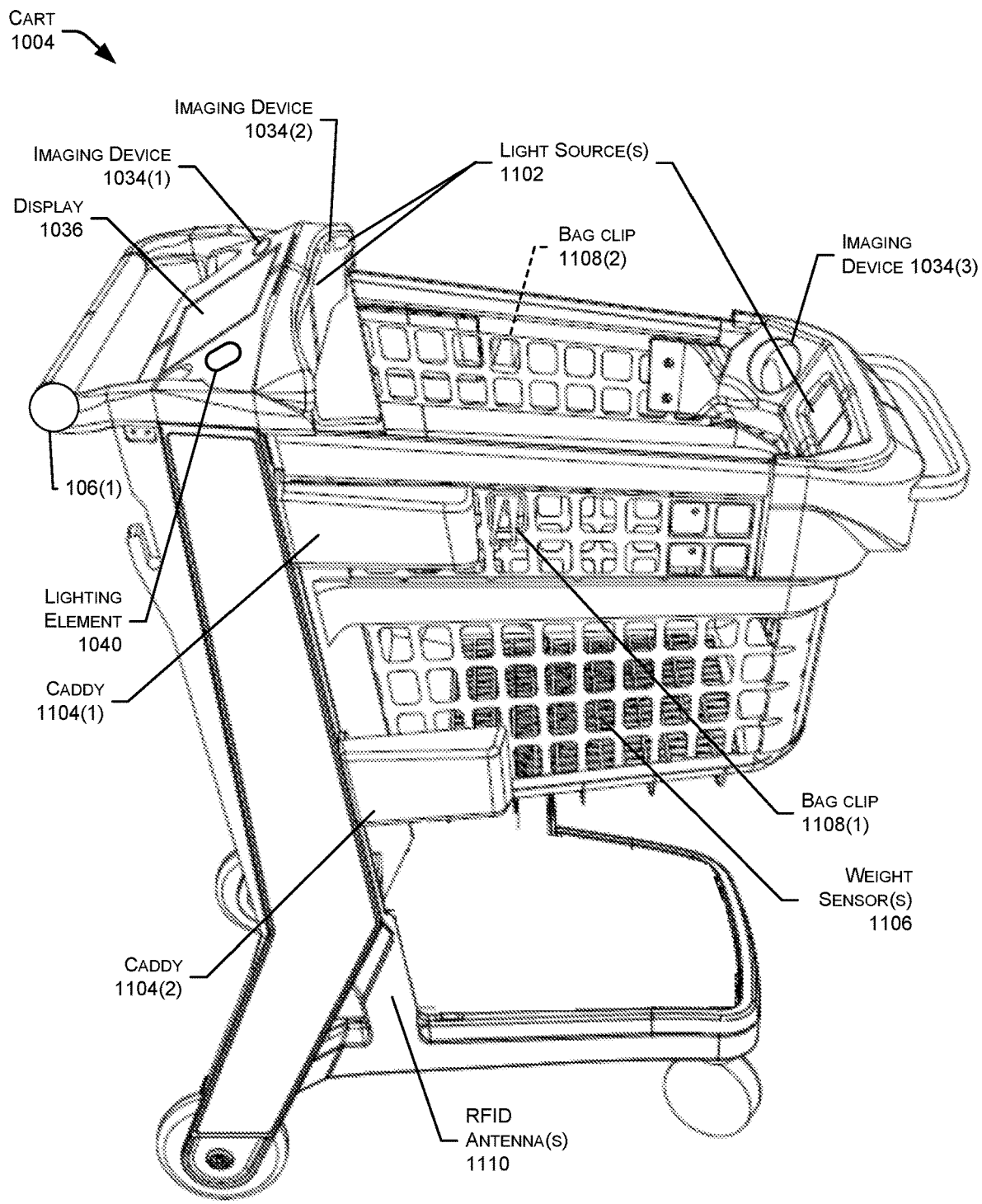
FIG. 11 illustrates the example cart of FIG. 10 in further detail. As illustrated, the cart may include at least one camera for identifying a user and one or more cameras for identifying items placed into and removed from the cart. The cart may include additional components, such as one or more weight sensors on each side of the basket of the cart, a handlebar on each side of the cart for pushing and/or pulling the cart, and various other features.

FIG. 11 illustrates the cart 1004 of FIG. 10 in further detail. As illustrated, the cart may include the first imaging device 1034(1) for identifying a user, the one or more second imaging devices 1034(2)-(N) for identifying items placed into or removed from the basket 1026, the display 1036 for presenting information to a user operating the cart 1004, and the one or more lighting elements 1040. In addition, the cart 1004 may include one or more light sources 1102 that function to emit light prior to and/or while the second imaging sensors 1034(2)-(N) generate the second image data for identifying items placed into and removed from the basket 1026. In some instances, these light sources 1102 emit constant light, while in other instances the light sources 1102 emit light in a strobing manner. In either of these instances, the light may be visible and/or non-visible light.

In addition, the cart may include one or more caddies, such as a caddy 1104(1) and a caddy 1104(2), coupled to the left and/or right side of the frame or basket of the cart 1004. For example, the cart 1004 may include the first and second caddies 1104(1) and 1104(2) on the right side of the cart, and two similarly situated caddies on the left side of the cart (not shown). Each caddy may define a receptacle (e.g., having an opening at the top) for housing one or more items therein. In some instances, the caddies may be beyond the FOV of the second imaging devices 1034(2)-(N) such that the user is able to place personal items (e.g., keys, wallet, phone, etc.) into the receptacle defined by the respective caddy without the imaging devices 1034(2)-(N) generating image data corresponding to this addition. In other instances, the caddies may be within the FOV of one or more of the imaging devices.

In addition, the cart 1004 may include one or more respective weight sensors 1106 for determining a current weight of the basket 1026 and, thus, items in the basket 1026. For example, one or more weight sensors 1106 comprising strain gauges or the like may reside underneath the basket 1026. In some instance the bottom platform of the cart may also include one or more weight sensors for determining the weight of items on the bottom platform. Further, in some in some instances each caddy may comprise a respective weight sensor 1106 comprising a strain gauge or other sensor that continuously or periodically may be used to determine a weight of the basket and/or whether a change in weight has occurred. For instance, the cart 1004 may include two weight sensors 1106 on each side of the basket 1026. Each pair of weight sensors 1106 may, in some instances, reside along the same vertical axis. That is, a top weight sensor on the right side of the basket 1026 may reside above a bottom weight sensor on the right side.

Regardless of the location of the weight sensors 1106, the weight data may be used to identify when items have been placed into or removed from the basket and, in some instances, may be used to identify items placed into or removed from the basket. For example, the weight data may be used to determine the identity of an item placed into or removed from the basket (e.g., to identify that a bottle of ketchup was placed into the basket), identify a number of instances of an item (e.g., a number of bottles of ketchup placed into the basket), to measure an amount of something (e.g. 1 pound of peanuts), and/or the like.

FIG. 11 further illustrates that the cart 1004 may include one or more bag clips, such as a bag clip 1108(1) on a right side of the basket 1026 and a bag clip 1108(2) on a left side of the basket 1026. As illustrated, the bag clips 1108 may reside on an outside, top portion of the basket such that a user may place a bag into the interior of the basket while securing a first strap of the bag to the first clip 1108(1) and a second strap of the bag to the second clip 1108(2). Thereafter, the user may place items into and/or remove items from the bag. At the end of the shopping session, the user may remove the bag containing the items from the basket (e.g., by removing the straps from the clips) and exit the facility.

FIG. 11 further illustrates that the cart 1004 may include one or more RFID antenna(s) 1110, which may be used for determining a location of the cart 1004 within the facility 1002. In some instances, the inventory locations 1012 may include respective RFID tags that may be read by the RFID antennas 1110 of the cart. In some instances, the cart 1004, or a remote system communicatively coupled to the cart 1004, may store map data that indicates associations between respective location with the facility to respective RFID tags throughout the facility. As illustrated, in some instances the RFID antennas 1110 may reside near a bottom portion of the frame of the cart. For instance, the cart 1004 may include an RFID antenna near a bottom portion of the right side of the frame and an RFID antenna near a bottom of the left side of the frame. In other instances, however, the RFID antennas 1110 may reside at other locations on the cart 1004 and/or distributed at multiple locations on the cart 1004.

Figure 12:
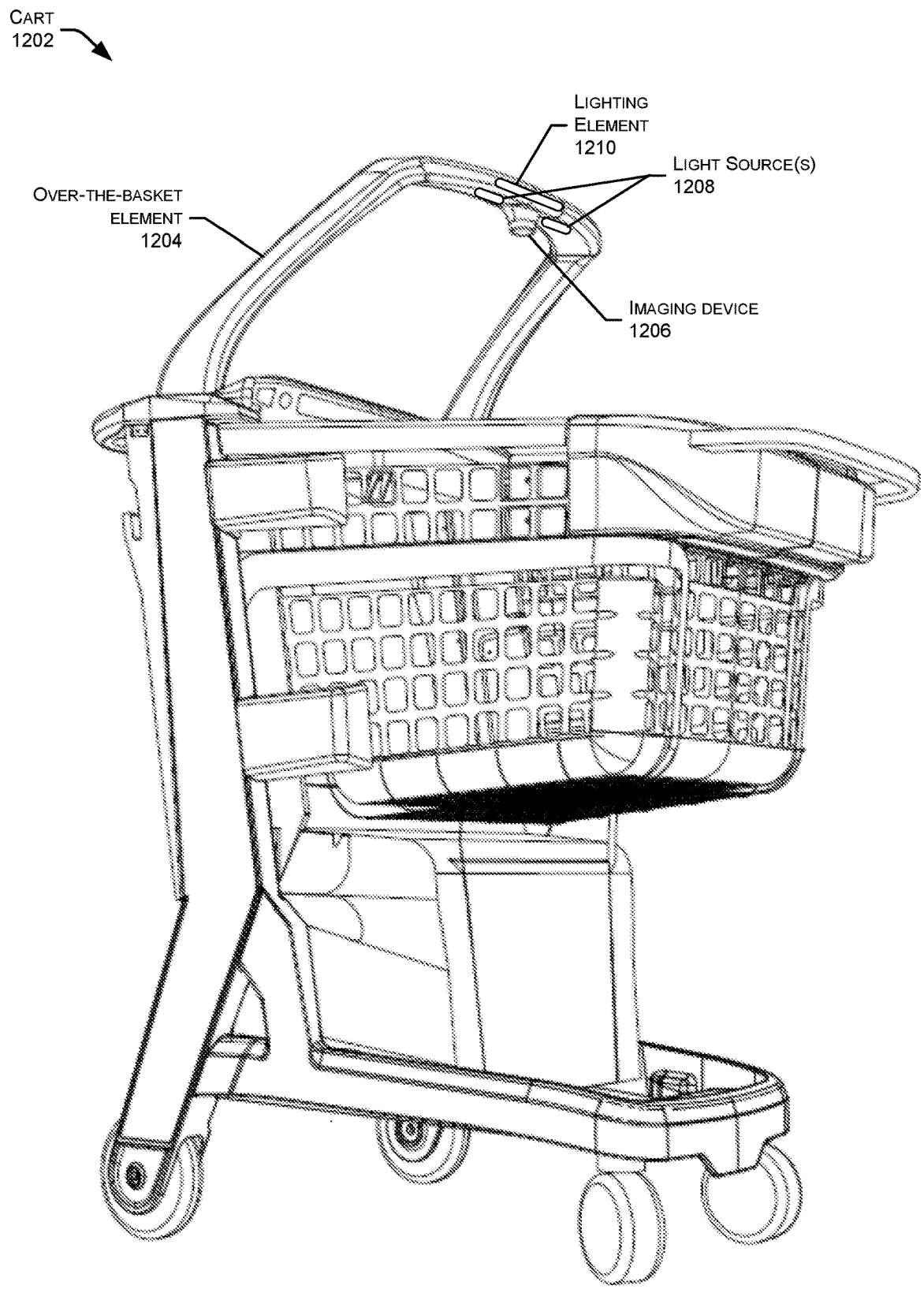
FIG. 12 illustrates an example cart that includes an over-the-basket element that may include a camera having a field-of-view into the basket of the cart for identifying items. The over-the-basket element may also couple to a lighting element configured to toggle between one or more states, such as an off state and an on state in which a user is requesting assistance.

FIG. 12 illustrates another example cart 1202 that may include some or all of the features described herein, including the proximity sensors and corresponding functionality described above and below. In addition, the illustrated cart 1202 includes an over-the-basket element 804 that may include an imaging device 1206 having a field-of-view into the basket of the cart for identifying items. That is, the imaging device 1206 may couple to a bottom surface of the element 1204 and may have an FOV that is directed substantially downwards into the basket. The over-the-basket element 1204 may also include one or more light sources 808 configured to emit light, similar to the light sources 1102 discussed above and below. These light sources may emit a constant light or may emit light according to a strobing pattern. Further, in some instances the light sources 1208 and/or 1102 may emit light in response to a proximity sensor detecting the presence of an item near the basket 1026. In some instances, the over-the-basket structural element 1204 may be detachable from the frame and/or basket of the cart, such that merchants (or users) may selectively remove the element 804 as desired.

As illustrated, the over-the-basket element 1204 may further include one or more lighting elements 1210 configured to toggle between one or more states, such as an off state and an on state. Similar to the lighting element 1040 discussed above, a user operating the cart 1202, an associate in the facility, and/or the cart 1202 itself may be configured to change a state of the lighting element 810 (e.g., from an off state to an on state, from a first color, to a second color, etc.). In some instances, the lighting element 1210 may emit light in response to a user operating a controller (e.g., physical switch, the display 1036, etc.) to indicate that the user is requesting assistance. In another example, the lighting element 1210 may indicate that the user and/or contents of the cart are subject to a particular workflow based on contents of the cart and/or the like (e.g., an age-verification workflow in which an associate of the facility is to verify an age of the use operating the cart 1202 and requesting to acquire a particular item).

Figure 13:
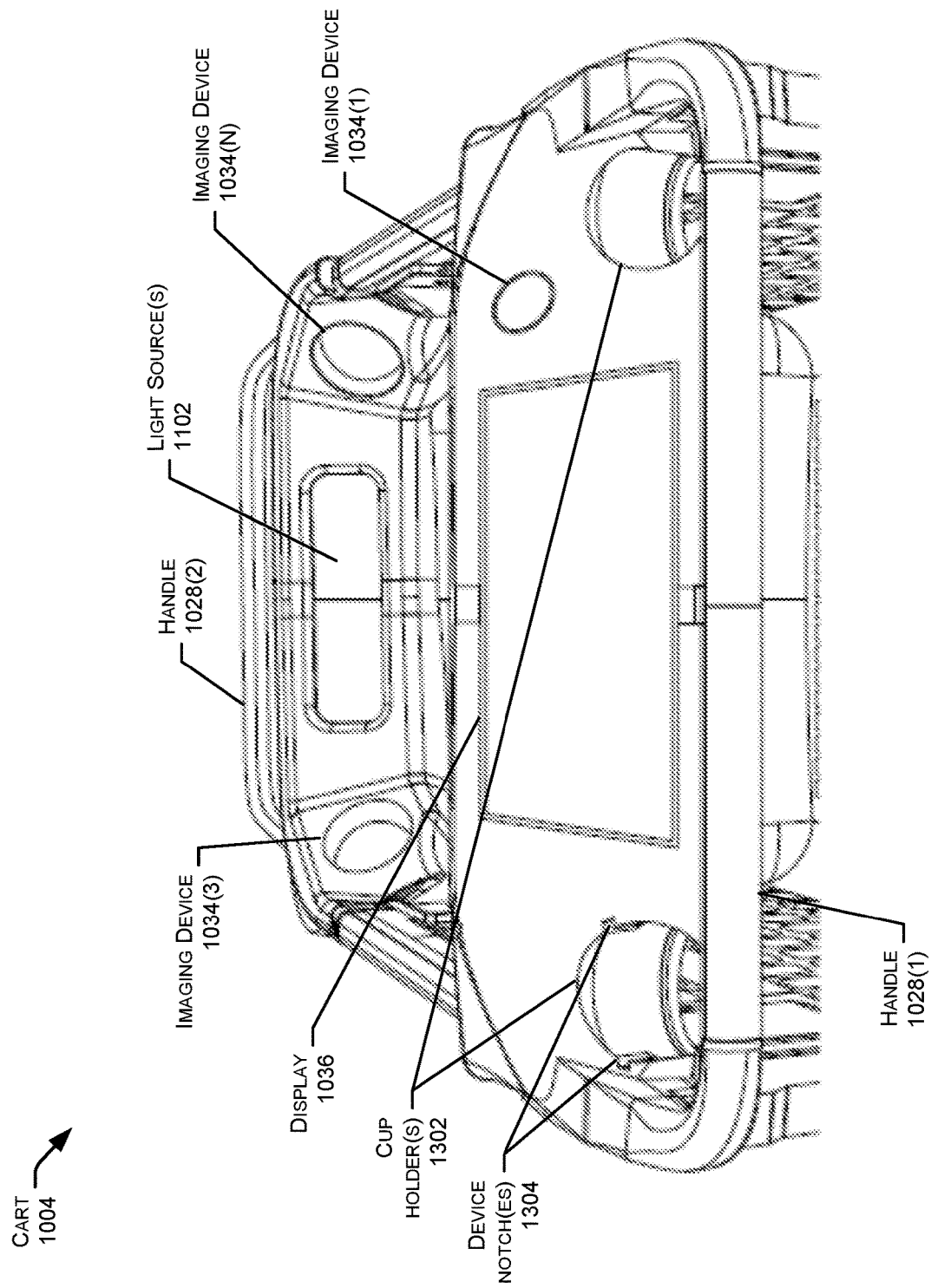
FIG. 13 illustrates an example front view of a cart. As illustrated, the cart includes a handlebar for pushing the cart, a camera for generating data for identifying a user operating the cart, and a display to present content to the user.

FIG. 13 illustrates an example front view of the cart 1004. As illustrated, the cart includes the first handle 1028(1) for pushing the cart 1004, the second handle 1028(2) for pulling the cart 1004, the imaging device 1034(1) for generating data for identifying a user operating the cart, the second imaging devices 1034(2)-(N), and the display 1036 to present content to the user operating the cart. The front view also illustrates that the cart may include the light source(s) 1102 between the imaging device 1034(3) and 1034(N). In some instances, the cart may further include a light source to the left of the imaging device 1034(3) and/or a light source to the right of the imaging device 1034(N).

In addition, the cart 1004 may include one or more cup holder 1302 (in this example, on the left and right sides of the display 1036) for holding respective cups of the user. In addition, each cup holder may include one or more device notches 1304, comprising recesses of the cup holder in which a user may secure a device, such as a mobile phone or the like. That is, the device notches 1304 may provide respective slots in which a user may place an electronic device, such as a phone, in a manner in which the device is secure while a display of the device is oriented towards the user operating the cart. Thus, the user, may engage in the shopping session while having a shopping list or the like displayed on a device that sits securely in the device notches 1304 of the cup holder 1302.

Figure 14:
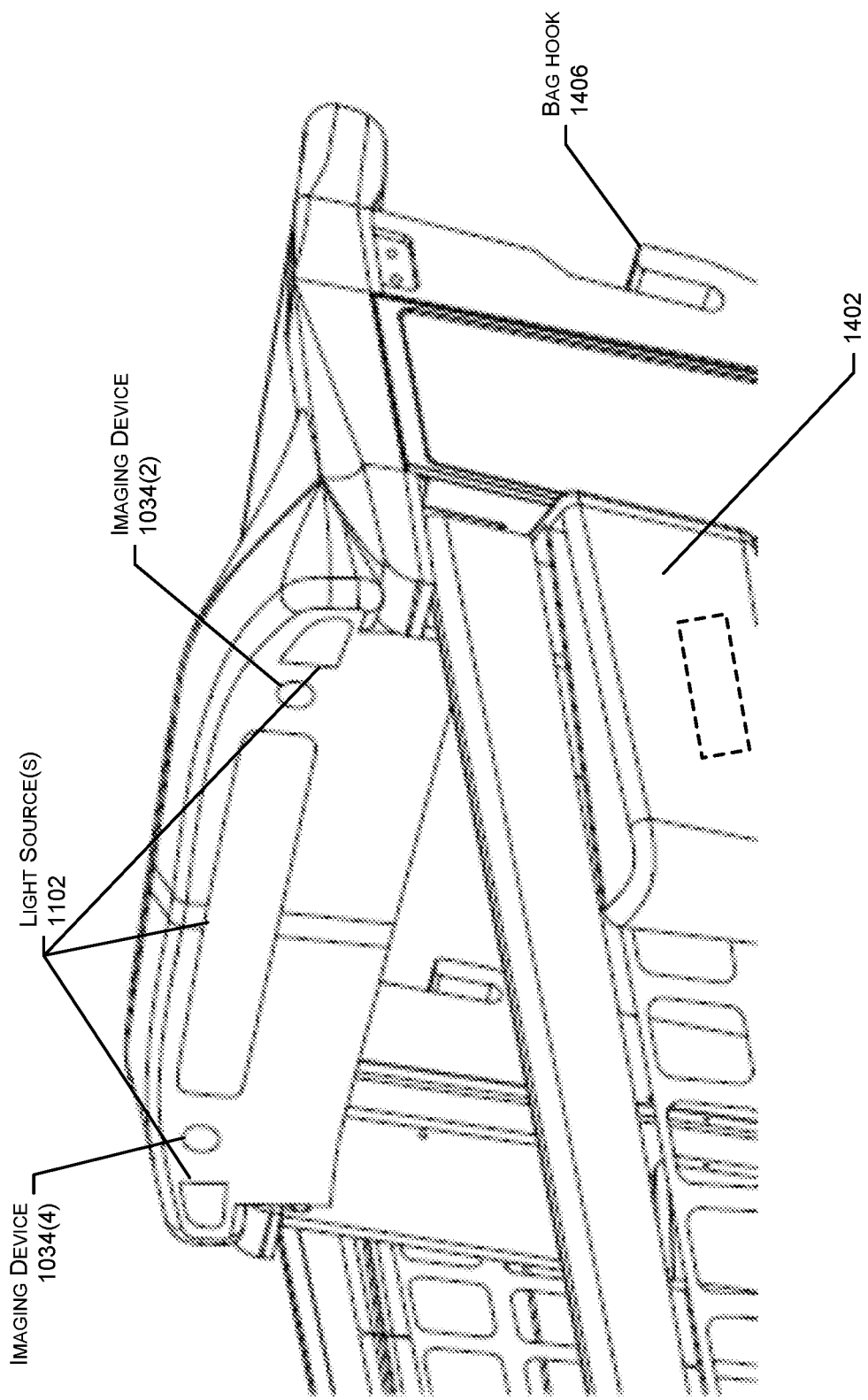
FIG. 14 illustrates a closer view of one or more cameras having a field-of-view substantially towards the basket of the cart.

FIG. 14 illustrates a closer view of one or more imaging devices 1034(2) and 1034(4) having an FOV substantially towards the basket of the cart. This figure also illustrates that the cart 1004 may include one or more light sources 1102 between the imaging devices 1034(2) and 1034(4), to the left of the imaging device 1034(4), and/or to the right of the imaging device 1034(2). In addition, FIG. 14 illustrates an example caddy 1402, which may define a receptacle for housing one or more items, as discussed above. Finally, this figure illustrates that the frame 1024 of the cart 1004 may include one or more bag hooks 1406, comprising hooks in which a user operating the cart 1004 may secure one or more bags. In some instances, the cart 1004 may include a bag hook 1406 on a rear-left side of the frame (e.g., near a user operating the cart) and/or a bag hook 1406 on a rear-right side of the frame. Further, while not illustrated, it is to be appreciated that the cart 1004 may include proximity sensors.

Figure 15B:
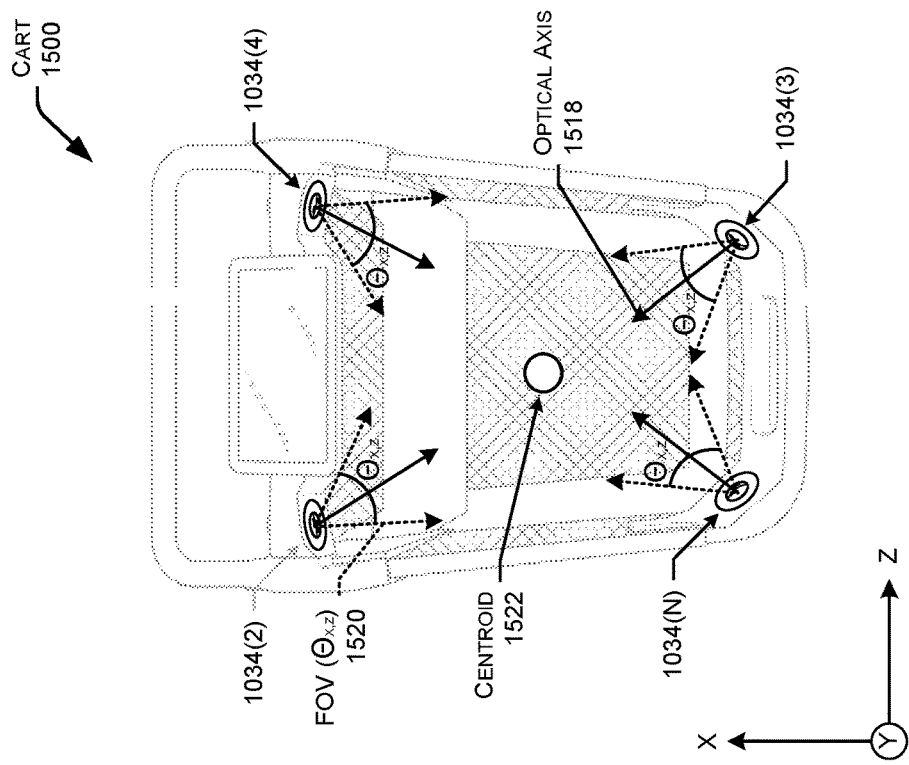
FIGS. 15A-D illustrate example views of an item-identifying cart that has one or more cameras for identifying items placed in the cart.
Figure 15A:
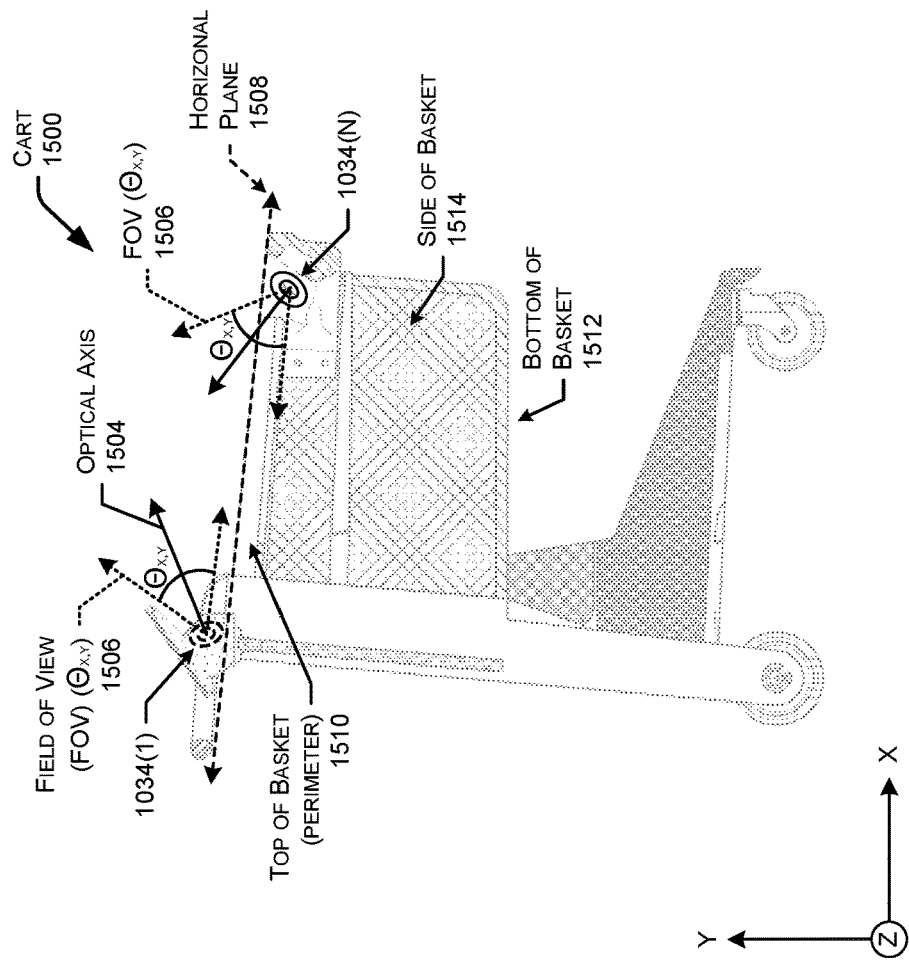

FIG. 15A illustrates an example cross-sectional view of an item-identifying cart 1500 that includes imaging device 1034 for identifying items 1006 placed in the cart 1500. Again, the cart 1500 may include the proximity sensors and corresponding functionality as described above with reference to the cart 1500. While this cart 1500 may have a different form factors than other carts illustrated and described herein, characteristics of the cart 1500 may be applied to the other cart form factors, and vice versa. As illustrated, the cross-section of the cart 1500 is taken along a plane defined by the x-axis and y-axis along the center of the cart 1500 from the back to the front of the cart 1500.

In some examples, the imaging device 1034(2) is positioned at a first corner of the basket 1026 near the back of the cart 1500. The imaging device 1034(2) may have an optical axis 1504 and an FOV 1506 oriented along the x-y plane. The optical axis 1504 of the first capture assembly 1034(1) may be directed upward from a substantially horizontal plane 1108 and towards the interior of the perimeter of the basket 1026. In some examples, the basket 1026 may include a bottom of the basket 1512, ones or more sides of the basket 1514 protruding up from the bottom 1512, and a top of the basket (perimeter) 1510 that is disposed along the substantially horizontal plane 1508. In some examples, the FOV 1506 of each of the second imaging devices may have a lower edge that is defined according to the horizontal plane 1508.

The first imaging device 1034(2) may have an optical axis 1504 directed upward from the substantially horizontal plane 1508 and towards the interior of the perimeter 1510 of the basket 1026. In some examples, the FOV ($\theta_{x,y}$) 1506 may be defined according to the optical axis 1504 (e.g., the optical axis 1504 may be approximately the middle of the FOV 1506). The FOV 1506 may be any FOV for of the second imaging devices (e.g., 80 degrees, 70 degrees, 45 degrees, etc.). Generally, the FOV 1506 may at least partially include an area above the top of the basket 1510. Similarly, another imaging device 1034(4) coupled proximate to a corner of the basket 1026 on the front of the cart 1500. The imaging device 1034(4) may have an optical axis 1504 directed upward from the substantially horizontal plane 1108 and towards the interior of the perimeter 1510 of the basket 1026. In some examples, the FOVs 1506 may include an area above the top 1510 of the cart 1500, an area within the basket 1026 of the cart, and/or a combination of above and below the top 1100 of the basket 1026.

FIG. 15B illustrates an example top view of an item-identifying cart 1500 that has imaging devices 1034(2)-(N) for identifying items 1006 placed in the cart 1500. As illustrated, the cart 1500 is shown from a top such that the dimensions of the cart 1500 are illustrated along an x-axis and a z-axis (x-z coordinate plane).

In some examples, four imaging devices 1034 are positioned at four different corners of the frame 1024 and/or basket 1026 of the cart 1500. Each of the four imaging devices 1034 may include respective optical axes 1518 directed inward relative to the perimeter 1510 of the basket 1026. Additionally, the four imaging devices 1034(2)-(N) may each have FOVs ($\theta_{x,z}$) 1520 that are defined according to the optical axes 1518 (e.g., the optical axes 1118 may be approximately the middle of the FOVs 1120). The FOVs 1120 may be any FOV for cameras in the imaging devices (e.g., 80 degrees, 70 degrees, 45 degrees, etc.). Generally, the FOVs 1520 for each of imaging devices 1034 may overlap at least partially at a centroid 1522 of the frame 1024 and/or basket 1026 of the cart 1500. The FOVs 1120 may, in combination, cover all, or most, of the interior of the perimeter 1510 of the basket 1026 such that items 1006 are detected and identified using at least one of the capture assemblies 1034.

Figure 15D:
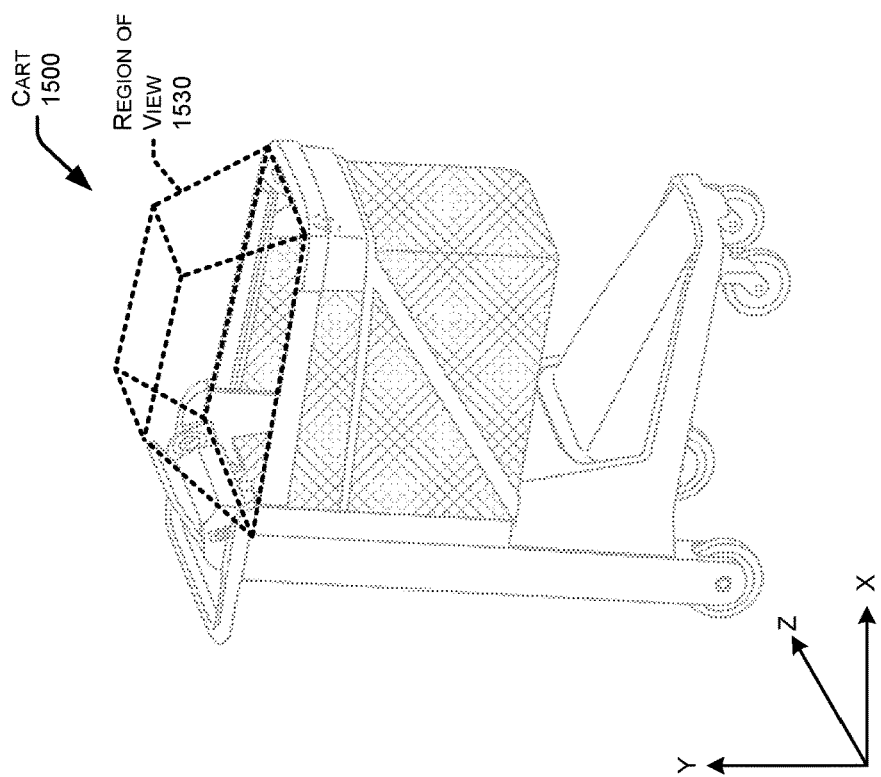
Figure 15C:
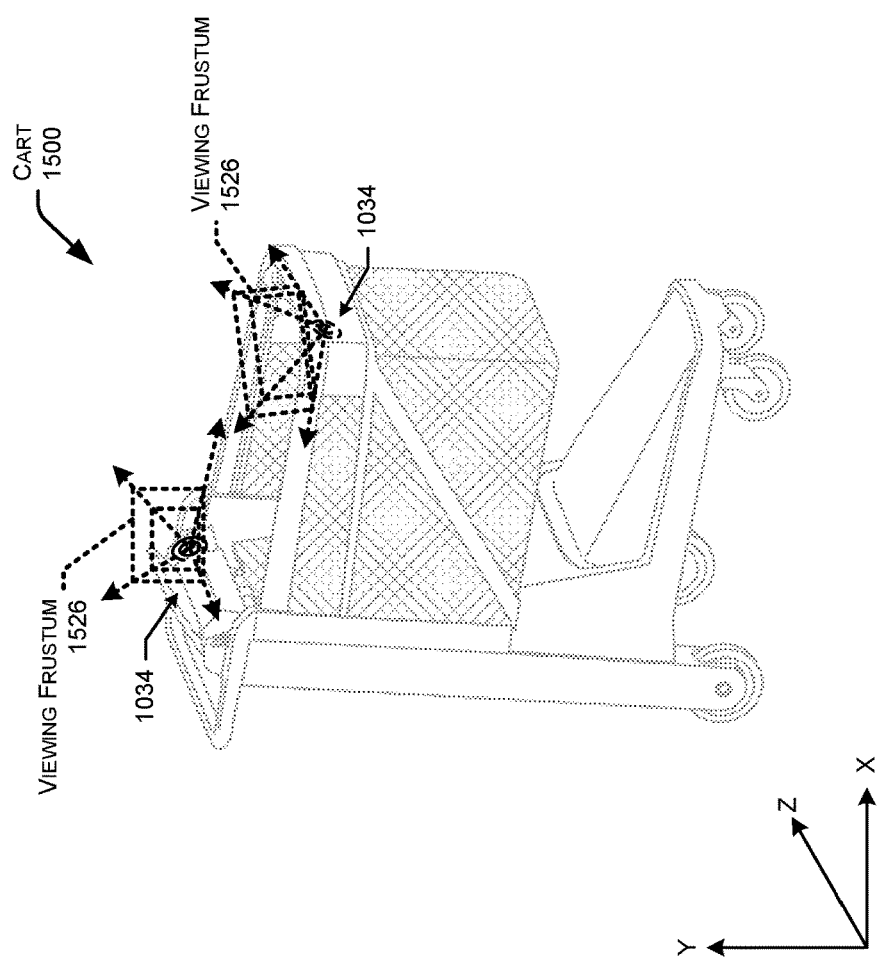

FIG. 15C illustrates an example perspective view of an item-identifying cart 1500 that has imaging devices 1034 for identifying items 1006 placed into the cart 1500. As illustrated, the cart 1500 may include multiple imaging devices that have viewing frustums 1526 that may be oriented in the same direction as the optical axis 1504. The viewing frustums 1526 may generally be the region of space in the environment of the cart 1500 that is within the field of view of the camera and/or proximity sensor of the imaging devices 1034. The viewing frustums 1526 for each of the imaging devices 1034 may be oriented inward to the basket 1026 of the cart, and upward relative to the top, or perimeter, of the basket 1510. The proximity sensor, if present, and imaging devices may have the same viewing frustum 1526, or different viewing frustum's 1126 that at least partially overlap.

FIG. 15D illustrates another example perspective view of an item-identifying cart 1500 that has imaging devices 1034 for identifying items 1006 placed into the cart 1500. As shown in FIG. 15D, the viewing frustums 1526 and/or FOV's 1506 for each of the imaging devices 1034 may generally define a region of view 1530. The region of view 1530 may comprise a volumetric, three-dimensional (3D) shape in which items 1006 are captured in image data of the cameras, and/or detected by proximity sensors. Thus, the region of view 1530 defines a volumetric region in which at least one of the cameras in a capture assembly is able to capture image data representing an item 1006. Generally, the region of view 1530 may encompass substantially all, or a large majority of, the perimeter of the top of the basket 1510. In this way, items 1006 placed in the basket 1026 will be detected and have image data generated that represents the items 1006 as they are being placed in the basket 1026. Although illustrated as including space above the basket 1026, in some examples, the region of view 1530 may additionally, or alternatively, include space inside the basket 1026 (e.g., downward facing cameras). In some instances, the region of view 1530 defined by the cameras on the cart 1004 may be the same as the region of view 1530 of the proximity sensors, or different than the region of view 1530 of the proximity sensors.

Figure 16:
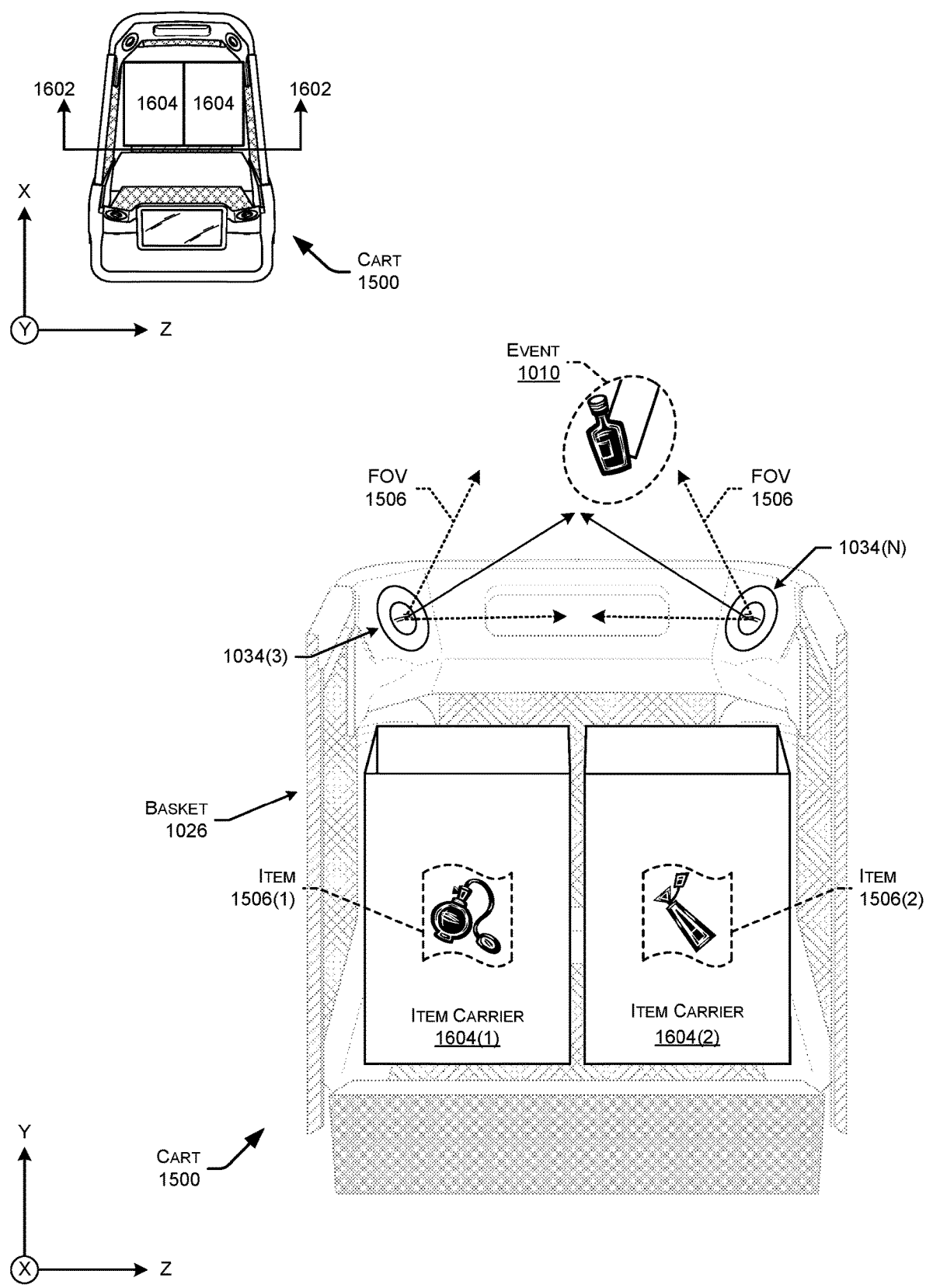
FIG. 16 illustrates another example cross-sectional view of an item-identifying cart that has item carriers placed inside the basket of the cart, and cameras that are used to identify an item being placed in the item carriers.

FIG. 16 illustrates another example of an item-identifying cart 1500, including a top view and a cross sectional view, that has item carriers 1604 placed inside the basket of the cart 1500, and imaging devices 1034 and light sources 1102 (within respective capture assemblies) that are used to identify an item being placed in the item carriers 1604.

As illustrated by the top view, the cart 1500 may include a basket that is sized to store one or more item carriers 1604, such as bags (e.g., plastic bags, paper bags, etc.), boxes, user-provided item carrier, and/or any other item carrier 1004. In some examples, the cart 1500 may have a basket 1026 that is sized to efficiently fit (e.g., minimize empty space in the basket 1026) one or more of the item carriers 1604. As shown in the cross-sectional view of the basket 1026 of the cart, the item carriers 1604 may be sized such that the tops of the item carriers 1604(1) and 1204(2) are below the perimeter defining the top of the basket 1026. In this way, the FOVs of the imaging devices 1034 are not obstructed by the item carriers 1604.

As shown, the item carriers 1604 may have items 1006 stored therein, which are no longer visible to cameras due to their placement in the item carriers 1604. Accordingly, if the imaging devices 1034 had FOVs 1506 that generated image data of the interior of the basket 1026, the items 1006 may not be visible due to occlusion from the item carriers 1604. However, to identify the items 1006 placed in a cart 1500, the imaging devices 1034 need to be able to view the items 1006, which would prevent users 1008 from being able to place item carriers 1604 in their carts 1004. Thus, by having FOVs 1506 that at least partly face upward relative to the top of the perimeter of the basket 1026, the items 1006 that are placed in the basket are identifiable in image data generated by the imaging devices 1034. Additionally, users 1008 are able to place their item carriers 1604 directly in the basket 1026 to receive items 1006 as the user 1008 shops, thereby reducing friction in the traditional-checkout experience by having to take items out of the cart 1500 to be bagged or otherwise placed in item carriers 1004.

In some examples, the basket 1026 (or other location on the cart 1500) may include one or more hooks to help support the item carriers 1604. For instance, the item carriers 1604 may be a cloth, or other material, with handles or holes. To help hold the item carriers 1604 open and/or up, the basket 1026 may include hooks near the top or perimeter and/or hooks on the outside of the basket 1026 to hook into holes of the item carriers 1604 and/or to hold up handles of the item carriers 1604, such as the bag clips 1108(1)-(2) discussed above.

Figure 17:
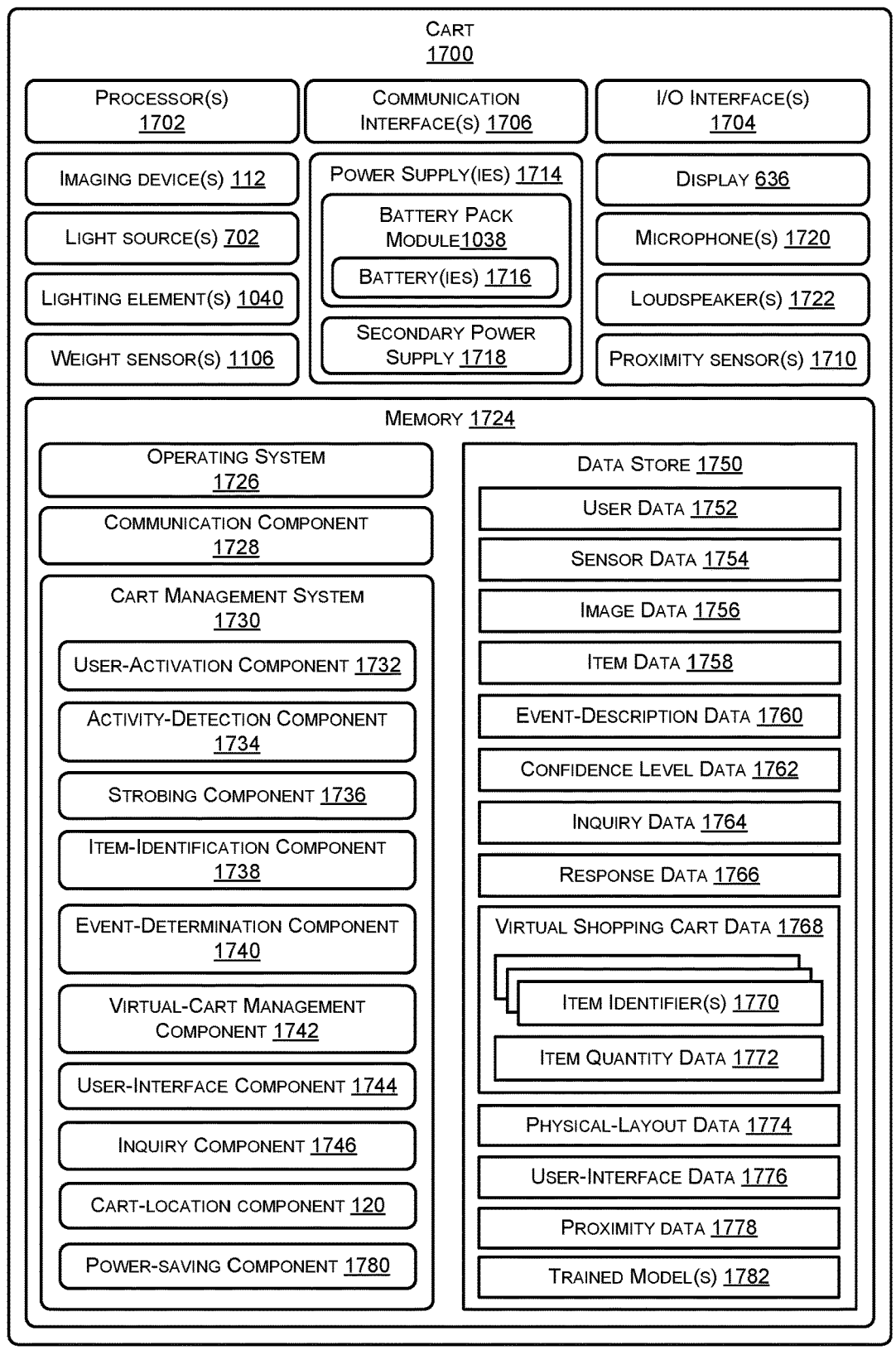
FIG. 17 illustrates example components of a cart configured to support at least a portion of the functionality of a cart management system.

FIG. 17 illustrates example components of an item-identifying cart 1700 configured to support at least a portion of the functionality of a cart management system. In some instances, the cart 1700 may correspond to and/or include some or all of the functionality of the carts described above.

The cart 1700 may include one or more hardware processors 1702 (processors) configured to execute one or more stored instructions. The processors 1702 may comprise one or more cores. The cart 1700 may include one or more input/output (I/O) interface(s) 1704 to allow the processor 1702 or other portions of the cart 1700 to communicate with other devices. The I/O interfaces 1704 may comprise Inter-Integrated Circuit (I2C), Serial Peripheral Interface bus (SPI), Universal Serial Bus (USB) as promulgated by the USB Implementers Forum, and so forth. The I/O interfaces 1704 may allow the various modules/components to communicate with each other and/or control each other.

The cart 1700 may also include one or more communication interfaces 1706. The communication interfaces 1706 are configured to provide communications between the cart 1700 and other devices, such as the server(s) 1020, sensors, interface devices, routers, and so forth. The communication interfaces 1706 may include devices configured to couple to personal area networks (PANs), wired and wireless local area networks (LANs), wired and wireless wide area networks (WANs), and so forth. For example, the communication interfaces 1706 may include devices compatible with Ethernet, Wi-Fi™, and so forth. The cart 1700 may also include one or more busses or other internal communications hardware or software that allow for the transfer of data between the various modules and components of the cart 1700.

The cart 1700 may also include the one or more imaging devices 1034, such as the first imaging device 1034(1) for identifying a user operating the cart and one or more second imaging devices 1034(2)-(N) for identifying items placed into and removed from a basket of the cart. The cart 1700 may further include the light sources 1102, the lighting elements 1040, and the weight sensors 1106 described above.

In some instances, the cart 1700 further includes one or more proximity sensors 1710. The proximity sensors 1710 may comprise any type of sensor that is able to detect the presence of nearby objects without the need for physical contact (e.g., ToF sensors, PIR sensors, infrared sensors, capacitive sensors, ultrasonic sensors, etc.). As described above, each proximity sensor may be configured to output an indication when the respective proximity sensor detects an object within a threshold distance of the sensor. Further, the configured threshold distances may vary from sensor to sensor in order to collectively create a virtual perimeter. Further, in some instances a single proximity sensor may be configured with multiple threshold distances. For instance, in the example of a proximity sensor having 104 diodes, the senor may be effectively split into quadrants of sixteen sensors such that each quadrant is configured to output an indication when an object is detected at a threshold distance that is potentially unique to the other three quadrants. For instance, a distance of a closest object of each diode of the sixteen diodes in a particular quadrant may be averaged and this average distance may be compared to a threshold to determine whether to output an indication that an object has been detected.

The imaging devices, meanwhile, may comprise any type of camera or imaging device configured to generate image data (and/or video data) or information descriptive of a plurality of picture elements or pixels. Additionally, in some instances the cart 1700 may include one or more imaging devices that are outward-facing and that generate image data representing the facility 1002 around the cart 1700.

The cart 1700 may include one or more power supply(ies) 1714 to provide power to the components of the cart 1700, such as the battery pack module 738. The power supply(ies) 1714 may also include a secondary (e.g., internal) power supply 1718 to allow for hot swapping of battery pack modules 738, such as one or more capacitors, internal batteries, etc.

The cart 1700 may also include a display 1036 configured to display image data, such as pictures, videos, user interface elements, and/or any other image data. The display 1036 may comprise any type of display 1036, and may further be a touch screen to receive touch input from a user. The cart 1700 may also include one or more microphones 1720 and one or more loudspeakers 1722 to facilitate a dialogue with a user 1008, and/or to receive feedback from the user 1008. The microphone(s) 1720 may capture sound representing the user's speech, and the loudspeaker(s) 1722 may output machine-generated words to facilitate a dialogue, prompt a user 1008 for feedback on an item 1006 and/or for other information, and/or output other alerts or notifications.

The cart 1700 may include one or more memories 1724. The memory 1724 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1724 provides storage of computer-readable instructions, data structures, program modules, and other data for the operation of the cart 1700. A few example functional modules are shown stored in the memory 1724, although the same functionality may alternatively be implemented in hardware, firmware, or as a system on a chip (SOC).

The memory 1724 may include at least one operating system (OS) component 1726. The OS component 1726 is configured to manage hardware resource devices such as the I/O interfaces 1704, the communication interfaces 1706, and provide various services to applications or components executing on the processors 1702. The OS component 1726 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1724. These components may be executed as foreground applications, background tasks, daemons, and so forth. A communication component 1728 may be configured to establish communications with one or more of the sensors, one or more of the servers 1020, or other devices. The communications may be authenticated, encrypted, and so forth.

The memory 1724 may further store a cart management system 1730. The cart management system 1730 is configured to provide the item-identifying functions (and other functions) provided by the cart 1700 as described herein. For example, the cart management system 1730 may be configured to identify a user operating a cart, identify items 1006 placed into the cart, and maintain a virtual shopping cart for a user 1008 of the cart 1700. While these components are described as operating on the cart 1700, in some instances some or all of these components reside additionally or alternatively on the servers 1020 or elsewhere. While not illustrated, the cart-management component 1724 may include each of the components described above, including the nearest-item component 122, the related-item component 124, the recommendation component 126, and the clustering component 128.

The cart management system 1730 may include a user-activation component 1732 that performs operations for activating a shopping session using a cart 1700 on behalf of a user 1008. For instance, a user 1008 may have previously registered for a user account with an operator of the facility to utilize various automated management services provided by an operator of the facility 1002. The user 1008 may have registered for a user account, such as by providing user data 1752, to automate payments made for items taken by the user and included a payment means (e.g., credit card, bank account number, etc.), and may have also provided an identification means in the user data 1752 to the user-activation component 1732 such that the cart 1700 can recognize the user 1008. For instance, the user 1008 may have registered to identify themselves to the cart 1700 using any identification technique by the user-activation component 1732, such as by providing user data 1752 by presenting an identification means to the first imaging device 1034(1) (e.g., presenting a driver's license, presenting a facility-issued card, presenting a user identifier via a mobile phone, etc.), speaking a predefined utterance that is captured by the microphone(s) 1720 (e.g., a name of the user, a predefined keyword, etc.), and/or looking into a camera for facial recognition. Once a user 1008 has identified themselves to using the user-activation component 1732, the user-activation component 1732 may open a shopping session where the cart 1700 identifies and track items 1006 retrieved by the user 1008 and placed in the cart 1700.

The cart management system 1730 may additionally include an activity-detection component 1734 configured to detect items 1006 (or objects) within a particular proximity to the cart. For example, one or more proximity sensor(s) 1710 may generate sensor data 1754 that indicates a distance between the proximity sensor(s) 1710 and any objects located in the FOV of the proximity sensor(s). The activity-detection component 1734 may analyze the sensor data 1754 and determine if an object is within a threshold distance indicating that the object is near the cart 1700 and/or within or near the perimeter of the top of the basket 1026 of the cart 1700 (e.g., one foot from the proximity sensor(s), two feet from the proximity sensor(s), etc.). In this way, the proximity sensor(s) may generate sensor data 1754 that indicates whether or not an item 1006 is being moved in or out of the basket 1026 of the cart 1700. However, in some examples, rather than using sensor data 1754 generated by a proximity sensor(s), the activity detection component 1734 may utilize image data 1756 generated by the imaging devices 1034(2)-(N) to determine if an object is within a threshold distance from the cart 1700.

The cart management system 1730 may further include a strobing component 1736 configured to cause the light sources 1102 and/or shutters of the imaging devices 1034 to strobe according to different frequencies. As noted above, the light sources 1102 may emit light in any light spectrum (e.g., infrared, near infrared, visible, etc.). However, some items 1006 may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the light sources 1102 to emit light in the visible spectrum. When generating image data 1756 using the imaging devices 1034, motion blur may appear when capturing fact moving objects. However, the motion blur may be reduced or eliminated by exposing the imaging device's imager for a short (e.g., sub-millisecond) durations. Accordingly, the strobing component 1736 may strobe the opening and closing of shutters of the imaging devices 1034 to limit the sensor exposure duration. Additionally, the strobing component 1736 may cause the LEDs to emit/strobe light at a particular frequency. In some instances, the strobing component 1736 may cause the LEDs to strobe at a first rate (e.g., 7200 hertz) prior to detecting predefined activity, such as a user placing an item into or removing an item from a cart, while causing the LEDs to strobe at a second, different rate (e.g., 100 hertz) upon identifying the predefined activity. Further, the LEDs may emit light in the visible range in some instances, and in the non-visible range in other instances. In some examples, the LEDs may comprise RGB LEDs that may be mixed according to different respective levels to tune a resulting color of the LEDs.

The cart management system 1730 may also include an item-identification component 1738 configured to analyze image data 1756 to identify an item 1006 represented in the image data 1756. The image data 1756 may comprise information descriptive of a plurality of picture elements, or pixels, for one or more image frames (e.g., a still picture, multiple picture frames, video frames, etc.). The item-identification component 1738 may analyze the image data 1756 using various image processing techniques, or computer vision techniques. For instance, the item-identification component 1738 may extract a representation of an item 1006 depicted in the image data 1756 generated by at least one imaging device 1034. The representation may include identifying text printed on the item 1006, colors or color schemes printed in the item, determining 2-D and/or 3D shapes of the items 1006, and/or other techniques for extract a representation of the item 1006. In some instances, the representation of the item 1006 depicted in the image data 1756 may comprise a numeric representation, such as a feature vector or a set of feature vectors.

In some examples, a data store 1750 stored in the memory 1724 may include item data 1758, which may include representations of the items 1006 offered for acquisition at the facility 1002. The item-identification component 1738 may compare the extracted represented of the item 1006 with the "gallery" or stored representations of the known items 1006 in the item data 1758. In some instance, the item representation may include an indication of a barcode or SKU data for the item 1006 as recognized in, or extracted from, the image data 1756. The item-identification component 1738 may determine confidence level data 1762 based on the comparisons with item representation in the item data 1758. The item-identification component 1738 may determine, and assign, confidence levels indicating how likely it is that the item 1006 represented in the image data 1756 corresponds to an item from the item gallery in the item data 1758. Based on the confidence level data 1762, the item-identification component 1738 may determine an item identifier 1770 for the item in the image data 1756 (or multiple item identifiers 1770) that corresponds to an item in the item data 1758 to which the item 1006 corresponds.

In some examples, the data store 1750 may include physical-layout data 1774 that is used by the item-identification component 1738 to determine the item 1006. The physical-layout data 1774 may include or provide a mapping of physical locations within the physical layout of devices and objects such that the location of the cart 1700 may be utilized to determine an item 1006 stored nearby. The physical-layout data 1774 may indicate the coordinates within the facility 1002 of an inventory location 1012, items 1006 stored at that inventory location 1012, and so forth. In examples where the cart 1700 has location determining sensors (e.g., GPS, RFID, proximity, etc.), the location sensor data may be used to determine where in the store the user 1008 is. In such examples, the item-identification component 1738 may access the physical-layout data 1774 to determine if a location associated with the event is associated with items 1006, and confidence levels for the corresponding representations of items in the item data 1758. Continuing the example above, given the location within the facility 1002 of the event and image camera data, the physical-layout data 1774 may determine the items 1006 that may have been represented in generated images of the event 1010.

The cart management system 1730 may further include an event-determination component 1740 to determine event-description data 1760 for the item 1006 in the image data 1756. The event-determination component 1740 may determine if the user 1008 is adding an item 1006 to the cart 1700, removing the item from the cart 1700, etc., based on movement of the item 1006 and/or whether the item is shown in the image data 1756. For instance, if the item 1006 is shown as being moved downward towards the interior of the cart 1700, and the user's hand then leaves the basket without the item 1006, it can be determined that the user 1008 added the item 1006 to the cart 1700. Similarly, if the user's hand 1008 moves into the cart without an item 1006 and is depicted in the image data 1756 taking an item 1006 from the cart, the event-determination component 1740 may determine that the user 1008 removed an item 1006 from the cart 1700.

The cart management system 1730 may also include a virtual-cart management component 1742 configured to manage virtual shopping cart data 1768 for the cart 1700. For instance, the virtual-cart management component 1742 may utilize the item data 1758, event-description data 1760, and confidence level data 1762 to add item identifier(s) 1770 to the virtual shopping cart data 1768 for items 1006 that were added to the cart 1700, remove item identifier(s) 1770 from the virtual shopping cart data 1768 for items 1006 that were removed from the cart 1700, and track item quantity data 1772 indicating quantities of particular items 1006 in the cart 1700.

The cart management system 1730 may further include a user-interface component 1744 configured to present user interfaces on the display 1036 based on user-interface data 1776. The user interfaces 1776 may include one or more fields to present data, and/or receive touch input (or other input via a keyboard, mouse, etc.) from a user 1008. For instance, if the item-identification component 1738 is unable to determine an item identifier 1770 for an item 1006 shown in the image data 1756, the user-interface component 1744 may receive inquiry data 1764 generated by an inquiry component 1764 to prompt a user 1008 for feedback to help identify the item 1006, and/or other information (e.g., if multiple items were placed in the cart 1700). The inquiry component 1746 may be configured to generate inquiry data 1764 based on the information needed to identify the item 1006. For instance, the inquiry data 1764 may include a prompt to request particular feedback from the user 1008, such as to provide input (e.g., touch input, vocal/utterance input, etc.) to identify the item 1006, input to indicate how many items 1006 were added to the cart, input to indicate whether an item 1006 was removed or added, etc. In some examples, the user-interface component 1744 may present one or more images depicting items from the item data 1758 that have the highest confidence levels as corresponding to the item 1006 in the image data 1756, but confidence levels that are not high enough to make a final decision as to the item 1006. For instance, the user-interface component 1744 may present pictures of two different items that have high confidence levels 1762 and request that the user 1008 select or indicate the appropriate item 1006. Additionally, or alternatively, the user-interface component 1744 may present user-interface data 1776 that prompts the user for feedback regarding whether or not the item 1006 was added to, or removed from the cart 1700. Responses to the inquiry data 1764 may be stored as response data 1766.

In some examples, the cart management system 1730 may further include the cart-location component 120 configured to determine locations of the cart 1700 in the facility 1002. For instance, the cart-location component 120 may analyze sensor data 1754 collected by sensors of the cart 1700 to determine a location, using the techniques described above or otherwise. In some examples, the communication interface(s) 1706 may include network interfaces that configured the cart 1700 to receive or detect wireless signals (e.g., WiFi signals, Bluetooth signals, etc.) and generate sensor data 1754 indicative of the signals. In addition to the techniques above, the cart-location component 120 may analyze the sensor data 1754 using various techniques to identify the location of the cart 1700, such as WiFi triangulation, received signal strength indicators (RSSI), and/or other methods for analyzing wireless signals to determine a location of the cart 1700. In some instances, the facility 1002 may include various infrared (IR) or near-IR emitters at different locations that emit light according to frequencies, patterns, etc. that indicate the different locations in the facility 1002. In such examples, the cart 1700 may include a light sensor to generate the sensor data 1754 representing the IR or NIR and determine the location of the cart 1700 in the facility. In some instances, there may be visible landmarks or markers throughout the facility that indicate a location in the facility, and the cart-location component 120 may analyze image data 1756 generated by an outward facing camera to determine a location of the cart 1700. As another example, there may be various radio frequency (RF) emitters positioned throughout the store, and the cart 1700 may include an RF receiver to allow the cart-location component 120 to perform IR beaconing to determine the location of the cart 1700. The cart-location component 120 may perform one, or any combination, of the above techniques to determine a location of the cart 1700 in the facility and/or any other technique known in the art.

The cart-location component 120 may perform various operations based on determining the location of the cart 1700 within the facility 1002. For instance, the cart-location component 120 may cause user interface data 1776 to be presented on the display 1036 that includes a map of the facility 1002 and/or directions to an item 1006 for the user of the cart 1700. Additionally, or alternatively, the cart-location component 120 may utilize the location of the cart, the physical-layout data 1774, and/or item data 1758 and "push" user interfaces to the display 1036 that indicate various location-based information, such as indications of deals for items 1006 located nearby, indications of items 1006 located nearby and on the user's shopping list, and/or other user interface data 1776.

In some examples, the cart management system 1730 may further a power-saving component 1780 configured to selectively power off or down one or more components of the cart 1700 when the cart 1700 determines that no users are within a threshold distance of the cart 1700.

For example, the power-saving component 1780 may be configured to determine when a user is not within a threshold distance and, in response, may instruct one or more components of the cart 1700 to power off or otherwise lessen the power the components consume from the batter(ies) 1716. For example, the power-saving component may instruct the item-identification component 1738 and/or the event-determination component 1740 to stop performing image-processing on the image data 1756 generated by the imaging devices 1034 or may instruct these components to perform the image-processing at a lesser frame rate. Additionally, or alternatively, the power-saving component may instruct the user-activation component 1732 or the activity-detection component 1734 to refrain from performing image-processing on the image data 1756 or lessen the frame rate at which these components perform the image-processing. In addition, or in the alternative, the power-saving component 1780 may instruct any of the other components of the cart management system 1730 to power off or down in order to consume less power in response to determining that a user is not within the threshold distance of the cart 1700, and/or may instruct any other software and/or firmware components of the cart 1700 to power off or down in response.

In addition, or in the alternative, the power-saving component 1780 may instruct one or more hardware components of the cart 1700 to power off or down in response to determining that a user is not within the threshold distance of the cart 1700. For instance, the power-saving component 1780 may instruct the imaging devices 1034 to power off or lessen a frame rate at which the imaging components 1034 generate the image data. Additionally, or alternatively, the power-saving component 1780 may instruct the display 1036 to power off (or dim its brightness) and/or may instruct the light sources 1102, lighting elements 1040, weight sensors 1106 (and/or weight-sensing firmware/software), the communication interfaces 1706, I/O interfaces 1704, the microphones 1720, the loudspeakers 1722, and/or any other hardware component of the cart 1700 to power off or otherwise consume less power from the batter(ies) 1716. Furthermore, in addition to power off or down any of these software, firmware, and/or hardware components of the cart 1700, the power-saving component 1780 may be configured to power on or up each of these components in response to determining that a user is within the threshold distance of the cart 1700 (e.g., within the example virtual perimeter 308).

The power-saving component 1780 may determining whether a user is within the threshold distance of the cart 1700 based on proximity data 1778 generated by the proximity sensors 1710. For instance, the power-saving component 1780 may receive the proximity data 1778 and analyze the proximity data to determine whether a user is within the threshold distance. In some instances, the proximity data 1778 indicates, for each sensor or quadrant (or the like) of a sensor, the distance to a closest user or other object. Thus, the power-saving component 1780 may determine whether the closest user/object is within the threshold distance and, if not, may send the instruction(s) for causing the component(s) to lessen their consumed power. Further, in some instances, the power-saving component 1780 may input the proximity data 1778 and/or additional sensor data generated at the same/similar time as the subject proximity data (e.g., image data 1756, accelerometer data, etc.) into one or more trained models 1782 for determining whether or not the object within the threshold distance of the cart corresponds to a user. If the trained model indicates that the object (or each object) detected by the proximity sensors 1710 does not correspond to a user, but rather an inanimate object (e.g., a rack in the facility), then the power-saving component 1780 may send the instruction(s) to lessen power consumed by the component(s) even if one or more (non-user) objects are detected within the threshold distance of the cart. It is to be appreciated that the trained model(s) may be trained by inputting training data in the form of labelled results (user, no user) and corresponding sensor data into the model during the training process. Of course, while one example is provided, the model(s) 1782 may be trained in any other manner.

In addition, while the above example describes the proximity sensors 1710 outputting proximity data 1778 indicating the distance to a nearest object, in some instances the proximity sensors may output an indication when an object is within a threshold distance but not otherwise. For instance, a first proximity sensor may be configured to output an indication in response to detecting an object within one foot, while another proximity sensor (or quadrant of the same proximity sensor) may be configured to output an indication in response to detecting an object within two feet. Thus, these proximity sensors may output the respective indications in response to detecting an object within their respective threshold distances, but otherwise may refrain from outputting data to the power-saving component 1780. Thus, the power-saving component 1780 may cause the component(s) to power off and/or down based on not receiving an indication of an object within a threshold distance from the proximity sensors 1710 for a threshold amount of time. In addition, the power-saving component 1780 may cause the component(s) to power off and/or down in response to receiving an indication that each object detected by a proximity sensor 1710 within a threshold distance within a certain amount of time does not correspond to a user, as determined by the trained model(s) 1782.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A mobile cart comprising:
   a frame that defines a basket;
   a display coupled to the frame;
   one or more cameras coupled to the frame to generate image data in a facility;
   one or more processors; and
   one or more computer-readable media storing computer-executable instructions that, when executed, cause the one or more processors to perform acts comprising:
      receiving the image data generated by the one or more cameras;
      determining, using the image data, a current location of the mobile cart in the facility;
      determining a first item, residing on a shelf in the facility and not within the basket of the mobile cart, that is associated with an item location that is within a threshold distance of the current location of the mobile cart;
      determining first data associated with the first item residing on the shelf and not within the basket;
      determining a second item in the facility using the first data associated with the first item residing on the shelf and not within the basket; and
      outputting, via the display, information associated with the second item.

2. The mobile cart as recited in claim 1, wherein:
   the determining the first data comprises determining first embedding data computed using first item description data associated with the first item;
   the one or more computer-readable media further store computer-executable instructions that, when executed cause the one or more processors to perform an act comprising:
      computing a similarity between the first embedding data and second embedding data computed using second item description data associated with the second item; and
   the determining the second item comprises determining the second item based at least in part on the similarity.

3. The mobile cart as recited in claim 2, wherein the one or more computer-readable media further store computer-executable instructions that, when executed cause the one or more processors to perform an act comprising determining that the similarity between the first embedding data and the second embedding data is greater than a respective similarity between the first embedding data and embedding data associated with each respective item in the facility.

4. The mobile cart as recited in claim 1, wherein the one or more computer-readable media further store computer-executable instructions that, when executed cause the one or more processors to perform acts comprising:
   determining that a first instance of a third item was placed into the basket of the mobile cart while the mobile cart was located at a first location in the facility;
   determining that a second instance of the third item was placed into the basket of the mobile cart while the mobile cart was located at a second location in the facility;
   computing an average location using at least the first location and the second location; and
   generating planogram data indicating that the third item is associated with the average location.

5. The mobile cart as recited in claim 4, wherein the average location comprises a first average location, the planogram data comprises first planogram data, and the one or more computer-readable media further store computer-executable instructions that, when executed cause the one or more processors to perform acts comprising:
   determining that a third instance of the third item was placed into the basket of the mobile cart while the mobile cart was located at a third location in the facility;
   determining that a fourth instance of the third item was placed into the basket of the mobile cart while the mobile cart was located at a fourth location in the facility;
   computing a second average location using at least the third location and the fourth location; and
   generating second planogram data indicating that the third item is associated with the second average location.

6. A method comprising:
   generating image data using one or more cameras;
   determining, using the image data, a location of a mobile cart in a facility;
   determining a first item, residing at an inventory location in the facility and not within a basket of the mobile cart, that is associated with a first item location in the facility that is within a threshold distance of the location of the mobile cart;
   determining that first text data associated with the first item is related to second text data associated with a second item residing in the facility and not within the basket of the mobile cart; and
   causing an output device to output recommendation data associated with the second item.

7. The method as recited in claim 6, further comprising determining that the first item location is nearest to the location of the mobile cart relative to each respective item location of a set of known item locations, and wherein the determining the first item comprises determining the first item based at least in part on the determining that the first item location is nearest to the location of the mobile cart relative to each respective item location of the set of known item locations.

8. The method as recited in claim 6, wherein the image data represents a ceiling of the facility and the determining the location of the mobile cart comprises:

analyzing the image data to identify one or more fiducials; and determining the location of the mobile cart based at least in part on identifying the one or more fiducials.

9. The method as recited in claim 6, further comprising:
comparing first embedding data, computed using the first text data, to second embedding data, computed using the second text data, to determine a first similarity score; and determining that the first similarity score is greater than a threshold similarity score;

and wherein the causing comprises causing the output device to output the recommendation data associated with the second item based at least in part on the determining that the first similarity score is greater than the threshold similarity score.

10. The method as recited in claim 6 wherein:
the first text data comprises first text associated with the first item in an item catalog;
the second text data comprises second text associated with the second item in the item catalog; and
the determining that the first text data is related to the second text data is based at least in part on a semantic similarity between the first text and the second text.

11. The method as recited in claim 6, wherein the recommendation data comprises first recommendation data, and further comprising:
determining that the first text data is related to third text data associated with a third item; and
causing the output device to output second recommendation data associated with the third item.

12. The method as recited in claim 6, wherein the causing comprises causing at least one of a display coupled to the mobile cart or a mobile device associated with a user operating the mobile cart to output the recommendation data associated with the second item.

13. The method as recited in claim 6, further comprising:
computing a respective similarity score between the first text data and text data associated with each respective item of multiple items offered in the facility; and
determining that a similarity score between the first text data and the second text data is a highest similarity score;
and wherein the causing comprises causing the output device to output the recommendation data associated with the second item based at least in part on the determining that the similarity score between the first text data and the second text data is the highest similarity score.

14. The method as recited in claim 6, wherein the facility comprises a first facility, the threshold distance comprises a first threshold distance, the recommendation data comprises first recommendation data, and further comprising:
determining, from planogram data associated with a second facility, that an item location of a third item in the second facility is within a second threshold distance of an item location of the first item in the second facility; and
causing the output device to output second recommendation data associated with the third item.

15. A system comprising:
one or more processors; and
one or more computer-readable media storing computer-executable instructions that, when executed, cause the one or more processors to perform acts comprising:

receiving a first indication that a first item, residing at an inventory location in a facility and not within a basket of a mobile cart, is associated with a first item location in the facility;

determining that first text data associated with the first item is related to second text data associated with a second item residing in the facility and not within the basket of the mobile cart;

storing a second indication that the second item is associated with the first item location; and sending, to the mobile cart, the second indication that the second item is associated with the first item location, the mobile cart to output recommendation data associated with the second item at least partly in response to determining that the mobile cart is within a threshold distance of the first item location based at least in part on analyzing image data generated by one or more cameras of the mobile cart.

16. The system as recited in claim 15, wherein the one or more computer-readable media further store computer-executable instructions that, when executed cause the one or more processors to perform acts comprising:
comparing first embedding data, computed using the first text data, to second embedding data, computed using the second text data, to determine a first similarity score; and determining that the first similarity score is greater than a threshold similarity score;

and wherein the storing comprises storing the second indication that the second item is associated with the first item location based at least in part on the determining that the first similarity score is greater than the threshold similarity score.

17. The system as recited in claim 15, wherein:
the first text data comprises first text associated with the first item in an item catalog;
the second text data comprises second text associated with the second item in the item catalog; and
the determining that the first text data is related to the second text data is based at least in part on a semantic similarity between the first text and the second text.

18. The system as recited in claim 15, wherein the one or more computer-readable media further store computer-executable instructions that, when executed cause the one or more processors to perform acts comprising:
determining that the first text data is related to third text data associated with a third item;
storing a third indication that the third item is associated with the first item location; and
sending, to the mobile cart, the third indication that the third item is associated with the first item location, the mobile cart to output recommendation data associated with the third item at least partly in response to determining that the mobile cart is within the threshold distance of the first item location.

19. The system as recited in claim 15, wherein the one or more computer-readable media further store computer-executable instructions that, when executed cause the one or more processors to perform acts comprising:
computing a respective similarity score between the first text data and text data associated with each respective item of multiple items offered in the facility; and
determining that a similarity score between the first text data and the second text data is a highest similarity score; and
wherein the storing comprises storing the second indication that the second item is associated with the first item location based at least in part on the determining that the similarity score between the first text data and the second text data is the highest similarity score.

20. The system as recited in claim 15, wherein the facility comprises a first facility, the threshold distance comprises a first threshold distance, the recommendation data comprises first recommendation data, and the one or more computer-readable media further store computer-executable instructions that, when executed cause the one or more processors to perform acts comprising:

determining, from planogram data associated with a second facility, that an item location of a third item in the second facility is within a second threshold distance of an item location of the first item in the second facility;

storing a third indication that the third item is associated with the first item location in the first facility; and sending, to a mobile cart in the facility, the third indication that the second item is associated with the first item location in the first facility, the mobile cart to output second recommendation data associated with the third item at least partly in response to determining that the mobile cart is within a threshold distance of the first item location in the first facility.

* * * * *